US009950634B2

(12) United States Patent
Bianco et al.

(10) Patent No.: US 9,950,634 B2
(45) Date of Patent: Apr. 24, 2018

(54) OVERHEAD CABLE MANAGEMENT FOR ELECTRIC VEHICLE CHARGING

(71) Applicant: Control Module, Inc., Enfield, CT (US)

(72) Inventors: James S. Bianco, Suffield, CT (US); John Fahy, Longmeadow, MA (US); David B. Palmer, Middletown, CT (US)

(73) Assignee: Control Module, Inc., Enfield, CT (US)

( * ) Notice: Subject to any disclaimer, the term of this patent is extended or adjusted under 35 U.S.C. 154(b) by 5 days.

(21) Appl. No.: 15/192,253

(22) Filed: Jun. 24, 2016

(65) Prior Publication Data
US 2017/0129351 A1 May 11, 2017

Related U.S. Application Data

(63) Continuation-in-part of application No. 14/915,717, filed as application No. PCT/US2015/039684 on Jul. 9, 2015.
(Continued)

(51) Int. Cl.
B60L 11/18 (2006.01)
B65H 75/44 (2006.01)
(Continued)

(52) U.S. Cl.
CPC .............. B60L 11/1818 (2013.01); B60L 3/04 (2013.01); B65H 75/4405 (2013.01);
(Continued)

(58) Field of Classification Search
CPC .............. B60L 11/1818; B60L 11/1816; B60L 11/1824; B60L 3/04; B65H 75/4405;
(Continued)

(56) References Cited

U.S. PATENT DOCUMENTS 6,117,034 A * 9/2000 Vine ..................... F16H 7/1263
474/134
8,058,841 B2 * 11/2011 Chander ............. B60L 11/1816
320/115
(Continued)

FOREIGN PATENT DOCUMENTS

WO WO2016007710 1/2016

OTHER PUBLICATIONS

Search Report.

Primary Examiner — Jason C Smith
(74) Attorney, Agent, or Firm — Alix, Yale & Ristas, LLP

(57) ABSTRACT

An overhead cable management for charging an electric vehicle employs a reel which receives a cable with an EV connector. A drive assembly employs a bi-positionable clutch and a gear assembly which sequentially engages a drive gear for the reel to unwind the cable from an overhead position to an ADA height, allow the cable and connector to be extended to connect with the EV and to wind the cable until a locked home position is obtained. The cable management is incorporated into an EVSE which is ceiling mounted, or an EVSE which is mounted to a pole or a wall. Numerous modules and features are optionally employed in connection with the operation of the cable management.

29 Claims, 38 Drawing Sheets

Related U.S. Application Data

(60) Provisional application No. 62/022,844, filed on Jul. 10, 2014.

(51) Int. Cl.
*B65H 75/48* (2006.01)
*B60L 3/04* (2006.01)

(52) U.S. Cl.
CPC ....... *B65H 75/446* (2013.01); *B65H 75/4471* (2013.01); *B65H 75/4486* (2013.01); *B65H 75/48* (2013.01); *B60L 2230/12* (2013.01)

(58) Field of Classification Search
CPC .............. B65H 75/446; B65H 75/4471; B65H 75/4486; B65H 75/48
USPC .................................................... 191/12.2 R
See application file for complete search history.

(56) References Cited

U.S. PATENT DOCUMENTS

| | | | |
|---|---|---|---|
| 2014/0021915 A1* | 1/2014 | Staley | H01R 13/635 320/109 |
| 2014/0048638 A1 | 2/2014 | Falk et al. | |
| 2014/0077761 A1* | 3/2014 | Hamrin | B60L 3/0023 320/109 |
| 2016/0121747 A1* | 5/2016 | Jefferies | H01H 3/16 320/109 |

* cited by examiner

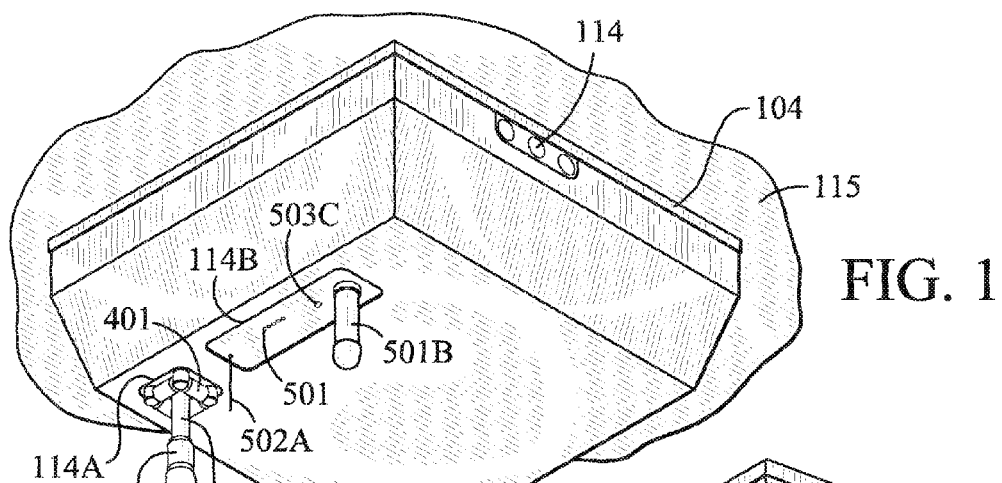
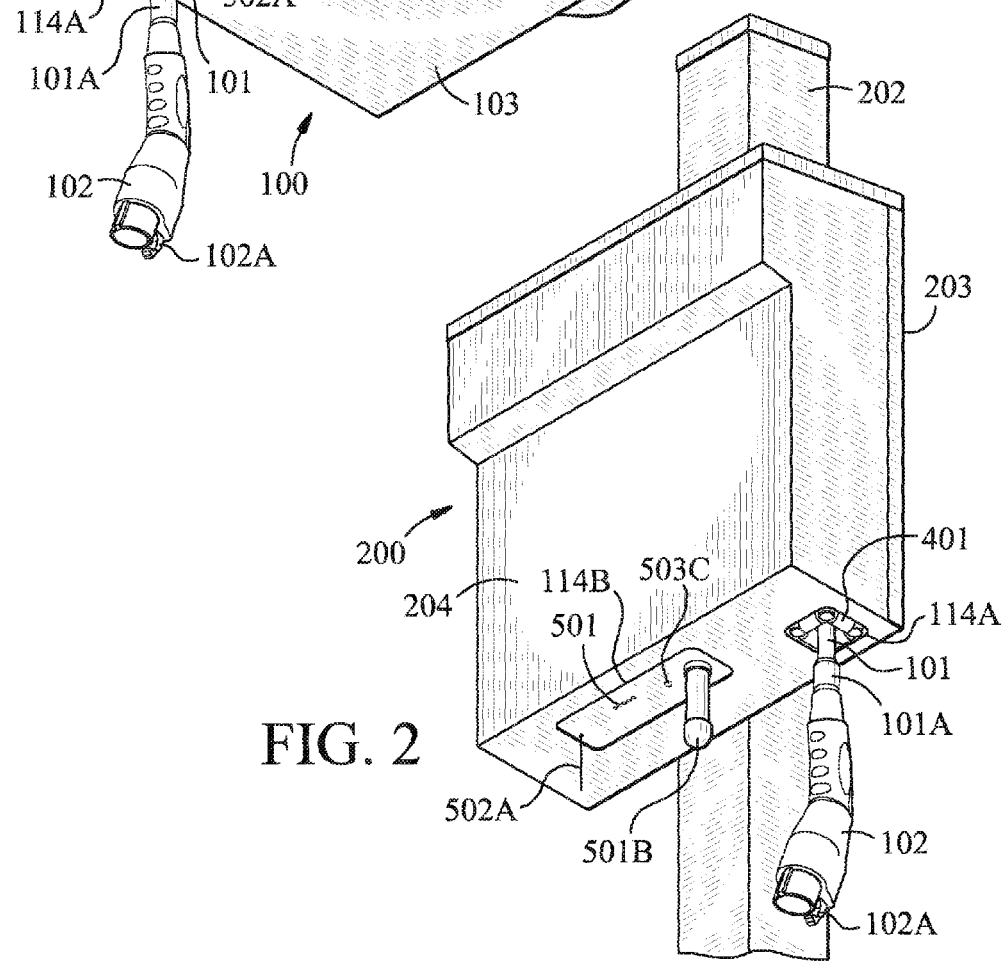

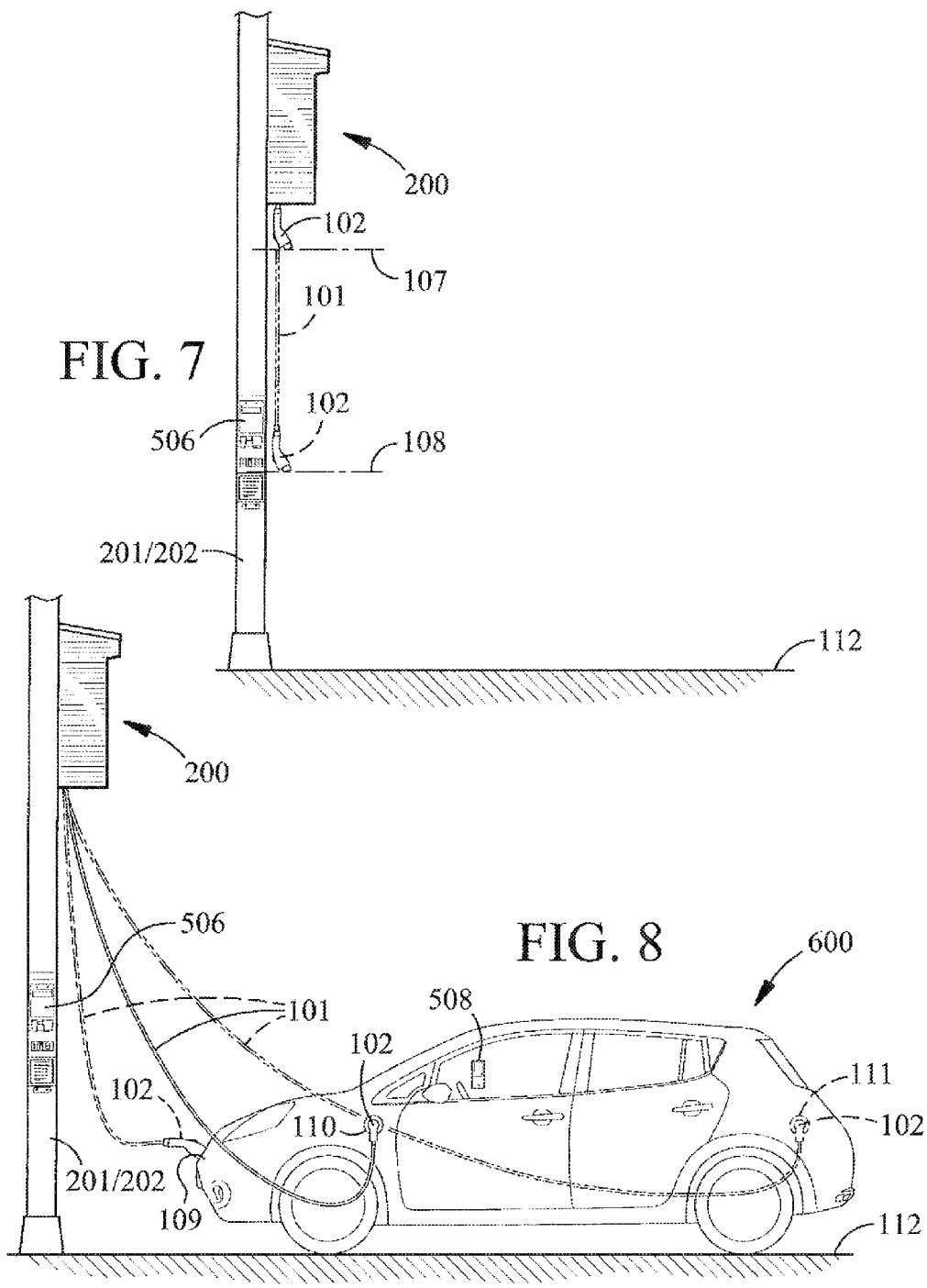

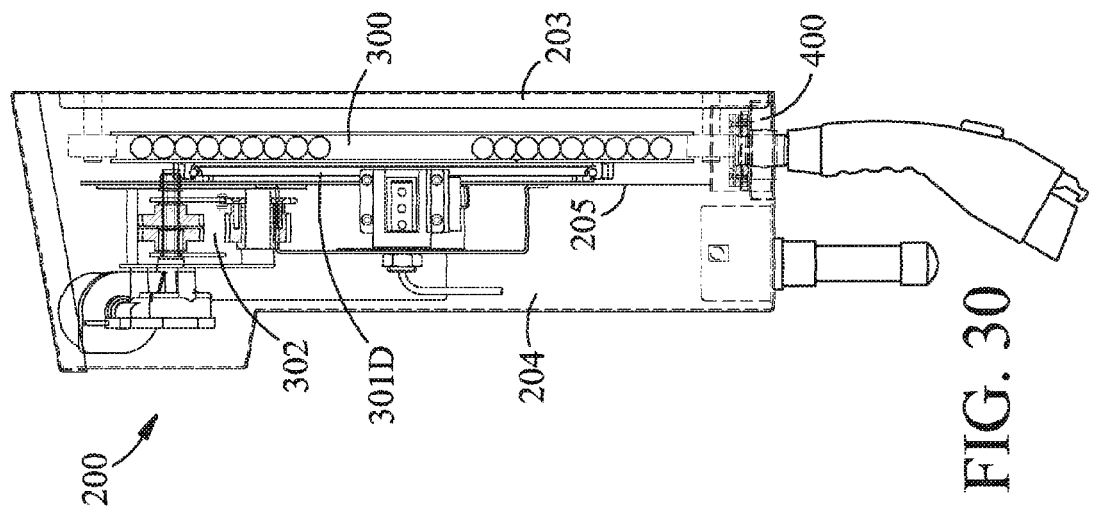
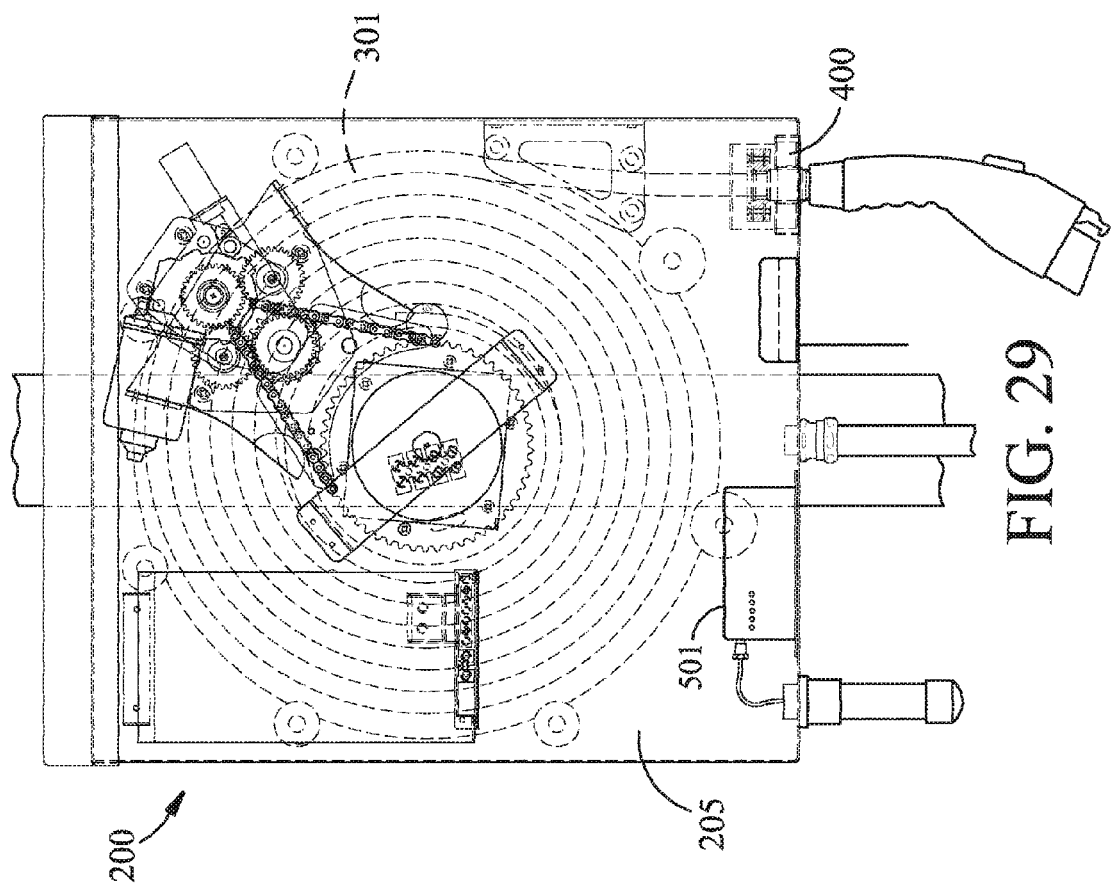

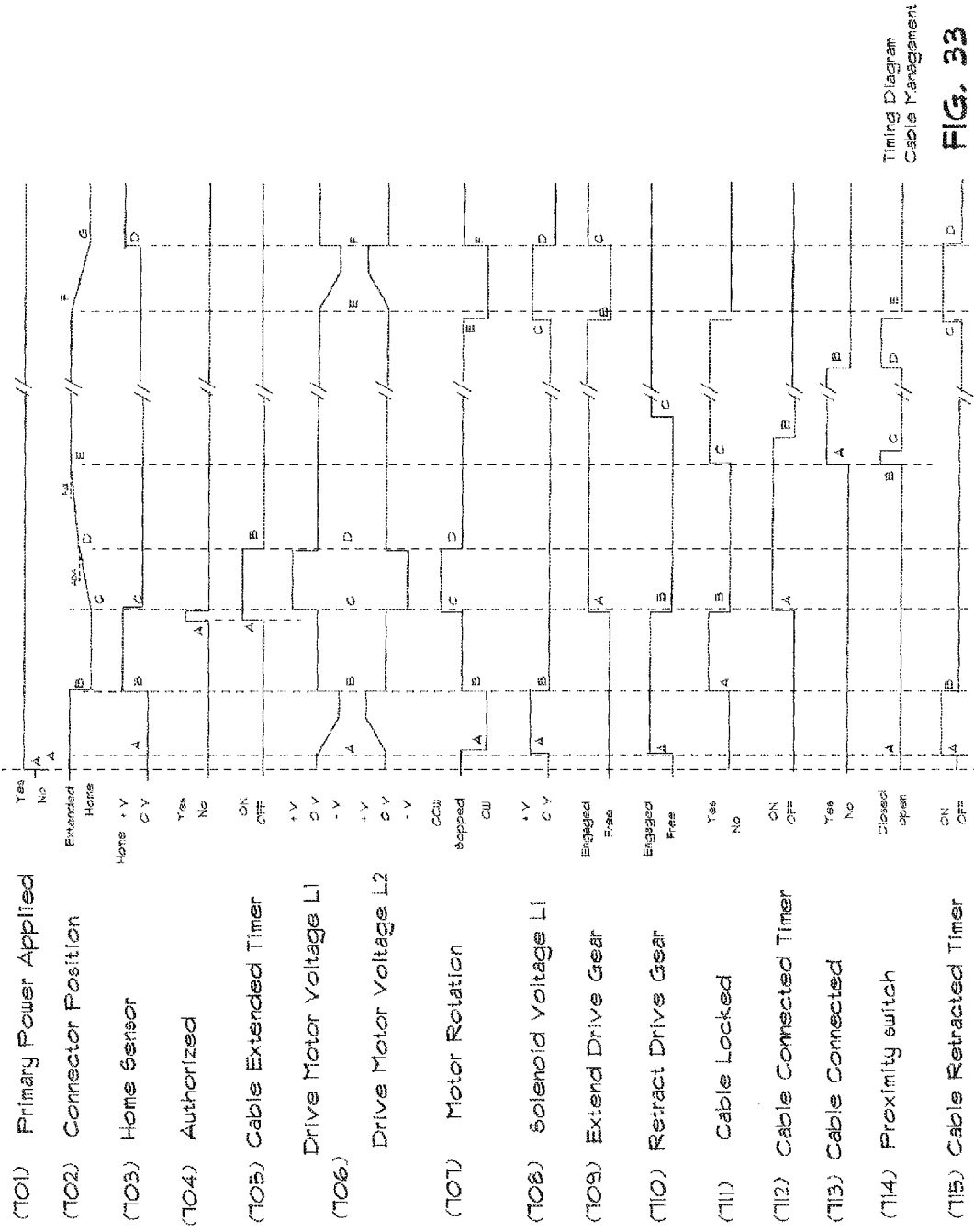

OVERHEAD CABLE MANAGEMENT FOR ELECTRIC VEHICLE CHARGING

CROSS-REFERENCE TO RELATED APPLICATION

This application is a continuation-in-part of U.S. patent application Ser. No. 14/915,717 filed on Mar. 1, 2016, which application is the National Stage Application of PCT/US2015/039684 filed on Jul. 9, 2015, which application claims the benefit of U.S. Provisional Application No. 62/022,844 filed on Jul. 10, 2014, the entirety of which applications are incorporated herein by reference.

BACKGROUND

This disclosure relates generally to installations for managing the cable and connector used to charge the batteries of an electric vehicle. More particularly, this disclosure relates to an overhead charging station which employs lowering and raising an electric cable having a connector for electrically connecting the electric vehicle service equipment (EVSE) with the battery power charging unit of the electric vehicle (EV).

With the large number of electric vehicle chargers being deployed for public use, there has arisen a need to manage the electric cable that connects the electric vehicle to the electric vehicle service equipment (EVSE). When the cable is not stored properly or left on the ground or pavement, it is exposed to the elements, such as rain, snow, ice and dirt. The cable left on the ground also becomes a tripping hazard. Systems that use cables and pulleys require outriggers that take up a large amount of space and still leave the cable exposed.

Publicly accessible EVSE installations have become widespread and assume numerous configurations and capabilities. Commonly, a publicly accessible EVSE is a post-mounted installation having a permanently attached electrical cable which may extend up to 25 feet in order to accommodate the connection to the electric vehicle. From a safety standpoint, it is exceedingly important that the cable cannot be allowed to lie on the pavement or adjacent area where it can be exposed to the elements, damaged, run-over or otherwise degraded. Furthermore in some installations such as public garages and multi dwelling homes, there are no walls or adequate space to mount currently available EVSEs. In addition, ground mounted EVSE may require protection bollard, which can be almost as expensive as the EVSE itself.

Ideally, the cable and connector, when not in use, should be raised to a height out of reach of vandals and those passing by, and automatically lowered to the point that the connector end of the cable is easily grasped by the user and freely extended to reach the inlet connector on the electric vehicle.

Naturally, it is highly desirable that any mechanism which allows the power cable to be extended and retracted must be reliable and efficient since the functionality of the EVSE is very dependent upon the connectivity to the electric vehicle and the integrity of the electrical connection.

This disclosure also pertains to the modularity and flexibility of the components of the EVSE and its support equipment and a management system which can easily be configured to meet the various system requirements.

SUMMARY

Briefly stated, in one embodiment, an EVSE installation comprises a unit with cable management that is mounted on a wall, pole or ceiling. Multiple activation methods are provided to adapt to a variety of EVSE installations. The EVSE unit is designed to easily mount overhead and provide a method for storing, locking, unlocking, lowering, releasing and retracting a power and control cable with its electrical connector.

An EVSE cable is wound and unwound on a cable reel having a hub by means of a motor drive unit with an electrically activated clutch. The clutch drives the cable reel in a direction to unwind the cable and still allows the cable to be manually extended. The clutch also reverses direction when the clutch solenoid is activated, and rewinds the cable onto the cable reel when the motor rotation is reversed.

The clutch locks the cable and connector in the stored (home) position and unlocks when the motor is energized with a release rotation.

As the cable and connector are lowered to the access position, a drive gear with a clutch bearing allows the cable to be freely extended manually, to thereby allow the connector to reach the charge inlet on the electric vehicle.

When the charge cycle is completed and the connector is removed from the charge inlet on the EV, the clutch solenoid is energized. This disconnects an extend idler gear from a motor drive gear and engages the retracted idler gear with the motor drive gear.

When the drive motor is energized, the cable is wound onto the hub so that the cable progressively forms a coiled configuration. The cable, as it rewinds, passes through a cable wiper and home position sensor. A home ring on the cable lifts the home sensor signaling that the connector is disposed at a stable home position. At that event, the drive motor and solenoid are deactivated locking the cable and connector in place.

The internal mechanical and electronic components are the same for the wall, pole or ceiling mounted electric vehicle service equipment (EVSE), although numerous optional features and modules may be employed. Only the enclosures are changed to facilitate the different mounting brackets.

In one embodiment, an EVSE installation comprises a housing. A reel is disposed in the housing and has a central hub rotatable about an axis. An electrical cable with a vehicle connector at one end and connectable to a power supply at the other end is retractable and extendable onto and from the reel. A cable management system comprises a drive assembly for the reel and has a drive mode to retract the cable and a release mode to extend the cable. The drive assembly drives the cable onto the reel so that the cable progressively winds on the hub to form a coiled configuration and the cable and connector are disposed at a stable home position. The cable management system comprises a clutch mechanism that remains locked when no power is applied.

The housing is supported on a ceiling, pole or a wall. The housing comprises a front cover that has an opening for a display panel and antennas and receives the vehicle connector at the home position and a rear cover that is mounted to either a pole or a wall. The housing alternatively may have a bottom cover and has an opening for a display panel and antennas and receives the vehicle connector at the home position and a top cover that is mounted to a ceiling.

The drive assembly comprises a motor and a drive gear rotatably connecting with a drive member. A clutch mechanism is controlled by a clutch solenoid. The management system comprises a clutch gear, a clutch arm and a spring attached to the clutch arm. Upon de-energizing the clutch solenoid, the clutch gear engages the drive gear. After sensing connection of the vehicle connector to an electric vehicle, the solenoid and the motor are not energized and the drive member is thereby locked to prevent further extension of the cable. Upon energizing the solenoid, the arm pivots and the clutch gear separates from the drive gear so the drive gear is free to rotate and the cable is freely extendable. Upon disconnecting the vehicle connector from the electric vehicle, the cable is automatically retracted into the reel by the drive assembly. A sensor senses the home position of the cable and the connector. The sensor comprises a mechanical lip, switch or a magnetic sensor. The cable passes through a centering guide ring.

In another embodiment, a cable management system for charging electric vehicles comprises a cable connectable to a power supply and having an EV connector. A rotatable reel receives the cable and releases and retracts the cable. A drive assembly for the reel comprises an electrically operated motor which connects via a clutch with a bi-positionable gear assembly engageable with a continuous transfer member operatively engageable with the reel to bi-directionally rotatably drive the reel. A controller automatically controls the drive assembly wherein the cable is lowerable to an access position manually extendable for connection to an EV and retractable to store the connector in a locked position.

The continuous transfer member comprises a sprocket chain in one embodiment. A drive sprocket and a driven sprocket are each engageable with the sprocket chain and a driven sprocket is rotatably fixed with the reel. The gear assembly comprises a first drive gear pinned to a motor shaft, a clutch drive gear with a clutch bearing, a retractor idler gear and a deployment idler gear wherein each of the idler gears are sequentially engageable with a drive sprocket gear. The gear assembly is mounted to an arm and the position of the arm is determined by a solenoid. The solenoid is spring biased to force the arm to position the deployment idler gear to engage with the drive sprocket gear. The solenoid is actuatable to position the arm wherein said deployment idler gear disengages from the drive sprocket gear and the retract idler gear engages the drive sprocket gear to retract the cable. At least one tension arm exerts a tension against the drive sprocket.

A home position sensor assembly senses the home position of the connector. A ground fault control module senses a ground fault and causes the termination of power to the cable. A communication module receives and transmits a remote signal. An end user power measuring module may be employed to precisely regulate the power supplied by the cable. An input unit for the controller comprises a device which may be either a card reader, a keyboard, a cell phone, a computer or a pay station. An EV sensor is also employed in some embodiments. A cable connected switch having a connected and a disconnected state and a cable connected timer for delaying retracting said cable for a pre-established time after occurrence of the disconnected state is also preferably employed.

BRIEF DESCRIPTION OF THE DRAWINGS

FIG. 1 is an isometric bottom view of the overhead EVSE assembly with motorized cable retracting capabilities, mounted on a ceiling and its power connector in the home locked position;

FIG. 2 is an isometric bottom view of the EVSE assembly with motorized cable retracting capabilities, mounted overhead on a pole and its power connector in the home locked position;

FIG. 7 is an elevation view of a wall mounted EVSE showing the cable and connector at its stored (home) position and at its lowered (ADA access height) position;

FIG. 8 is an elevation view of a wall and pole mounted EVSE showing the extent of the cable and connector attached to an electric vehicle at three different inlet positions;

FIG. 9 is a block diagram of an overhead EVSE assembly with motorized cable management and its peripheral control modules;

FIG. 29 is a rear view, partly diagrammatic, of a wall mounted EVSE assembly with a home sensing assembly, a cable reel with a coiled cable and a motorized cable and a drive clutch plate assembly;

FIG. 30 is a side view, partly diagrammatic, of a wall or pole mounted EVSE assembly with a home sensing assembly, a cable reel with a coiled cable, a motorized drive assembly and a clutch plate assembly;

FIG. 33 is a timing diagram of the cable management motor drive system for the EVSE;

DETAILED DESCRIPTION

Reference is made to the drawings wherein like numerals and designations constitute like parts and features throughout the figures. A cable management system is employed in two types of EVSE installations, each of which are capable of incorporating numerous optional modules.

General System Description

Electric vehicle service or supply equipment (EVSE) 100 and EVSE 200, each incorporates a motorized cable mechanism for winding and unwinding a power cable 101 on a reel to raise or lower an attached power connector 102 which preferably complies with J1772 standards.

Figure 3:
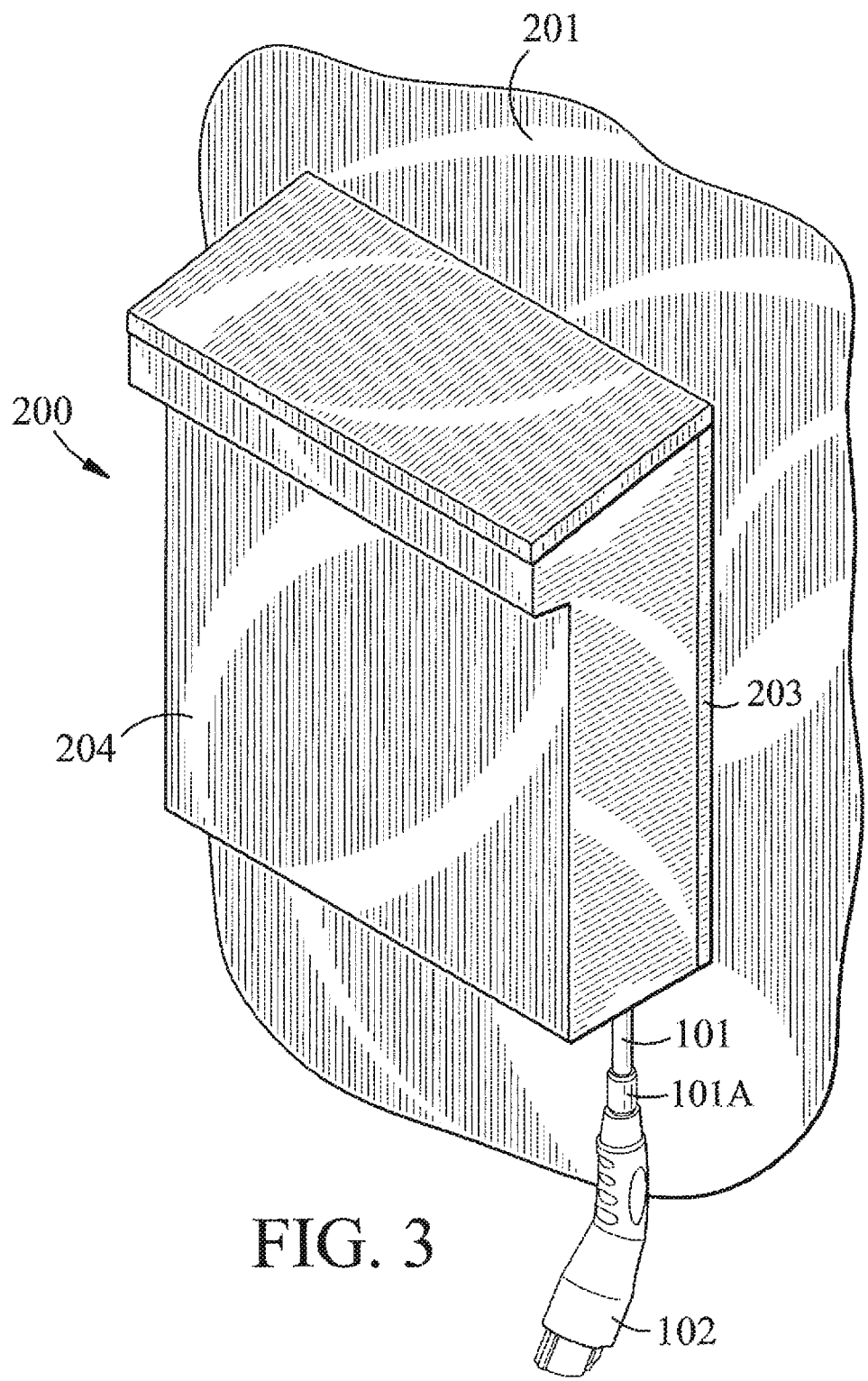
FIG. 3 is an isometric top view of the EVSE assembly with motorized cable retracting capabilities, mounted overhead on a wall and its power connector in the home locked position.

EVSE 100 is mounted to a ceiling (FIG. 1), EVSE 200 may be mounted to a pole 202 (FIG. 2) or a wall 201 (FIG. 3).

When EVSE 100 (FIG. 5) is mounted overhead to the ceiling 115, the connector 102 is stored at a height 107 that is out of reach of vandals and those passing by. When authorized, the cable 101 is unwound for a given time period, from the cable reel 301 (FIG. 13A) which in turn lowers the connector 102 to the height 108 above the floor 112, that meets the ADA requirements.

As the cable 101 (FIG. 6) is lowered from the ceiling mounted EVSE 100, it is free to be extended manually, so that the connector 102 can reach the different electric vehicle 600 inlets 109, 110, 111.

When EVSE 200 (FIG. 7) is mounted overhead on a pole or wall 201, 202, the connector 102 is stored at a height 107 that is out of reach of non-users. When authorized, the cable 101 is unwound from the cable reel 301 (FIG. 13A) for a given time period, which in turn lowers the connector 102 to the height 108 above the floor 112, that meets the ADA requirements.

As the cable 101 (FIG. 8) is lowered from the pole 202 mounted EVSE 200, it is free to be extended manually so that the connector 102 can reach the different electric vehicle 600 inlets 109, 110, 111.

EVSE 100 has a housing or enclosure (FIG. 1) that includes a bottom cover 103 and a top cover 104.

EVSE 200 has a housing or enclosure (FIG. 2) that includes a rear cover 203 and a front cover 204.

Figure 10:
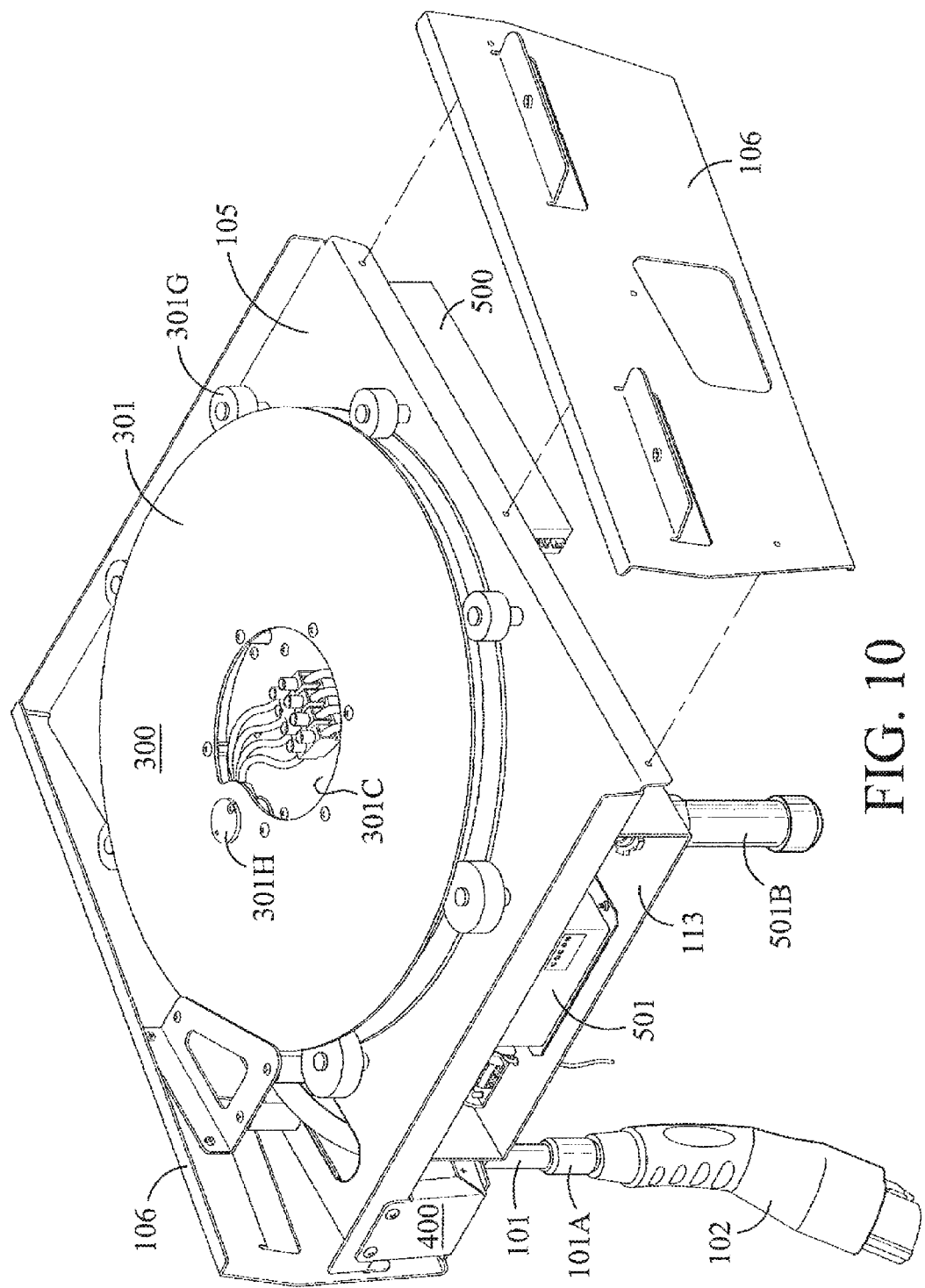
FIG. 10 is an isometric top view of the overhead EVSE assembly with motorized cable retracting capabilities, with the top and bottom covers removed.
Figure 10A:
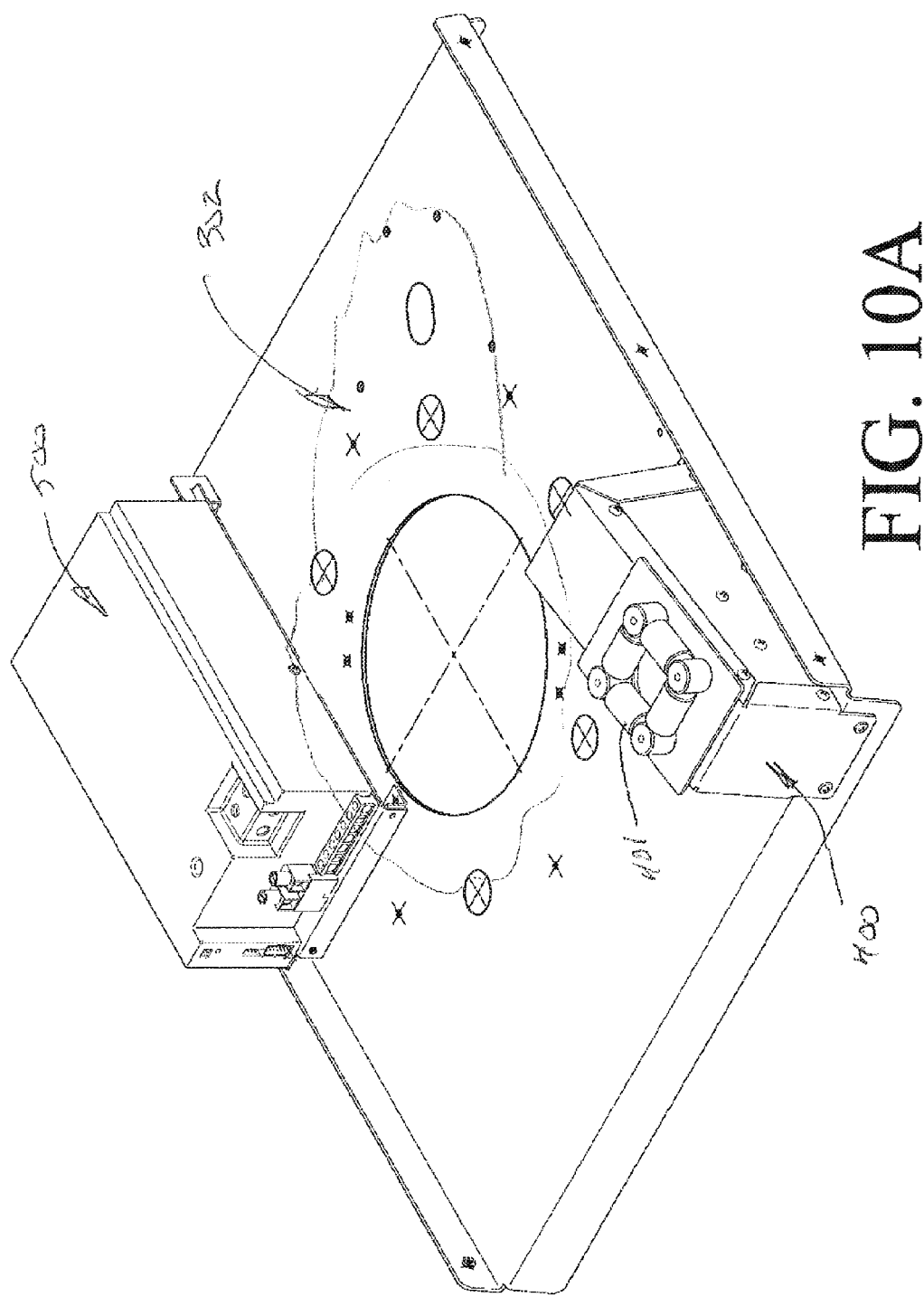
FIG. 10A is an isometric bottom view of the overhead EVSE assembly with motorized cable retracting capabilities, with the top and bottom covers, cable and connector removed.
Figure 11:
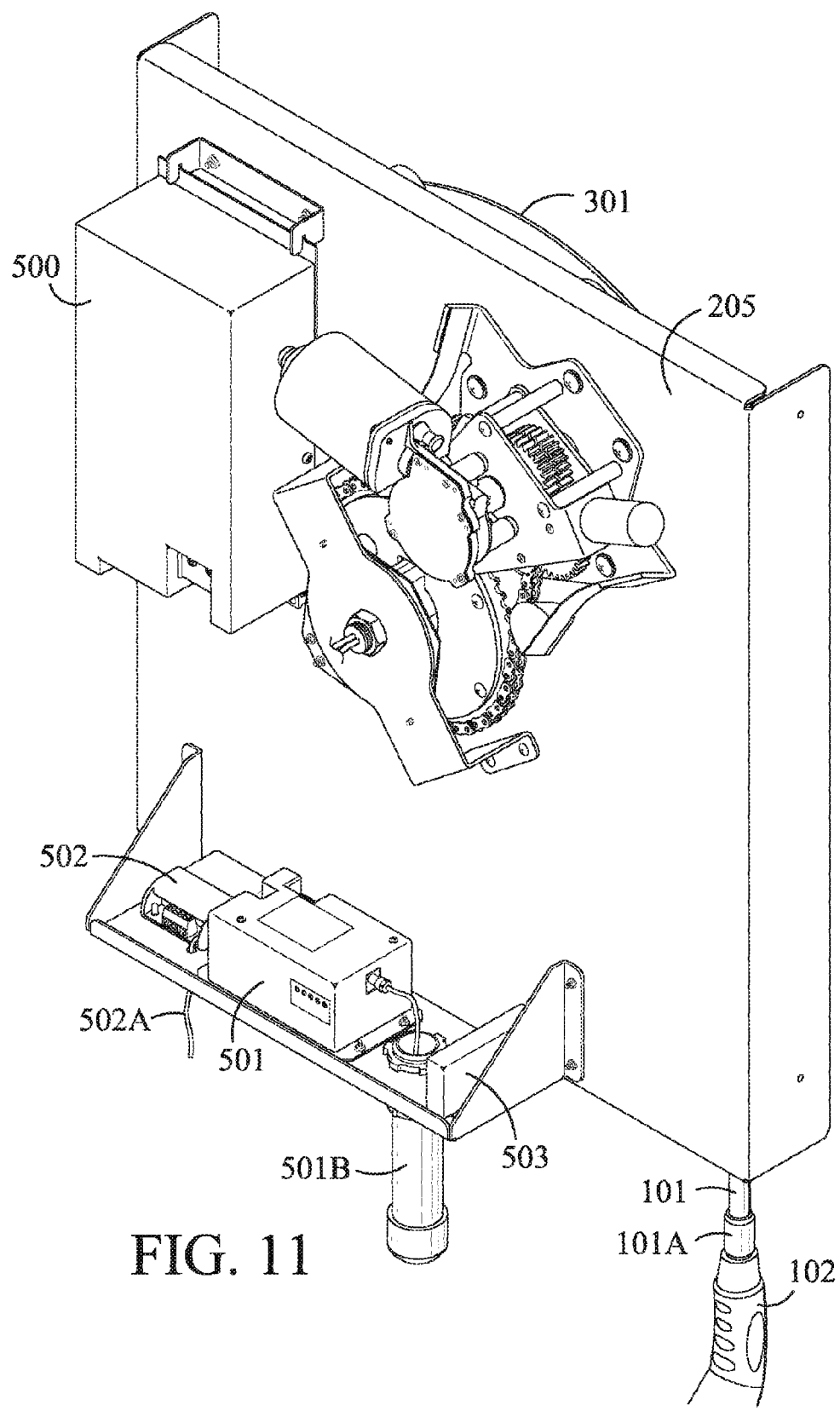
FIG. 11 is an isometric front view of the wall EVSE assembly with motorized cable retracting capabilities, with front and rear covers removed.
Figure 11A:
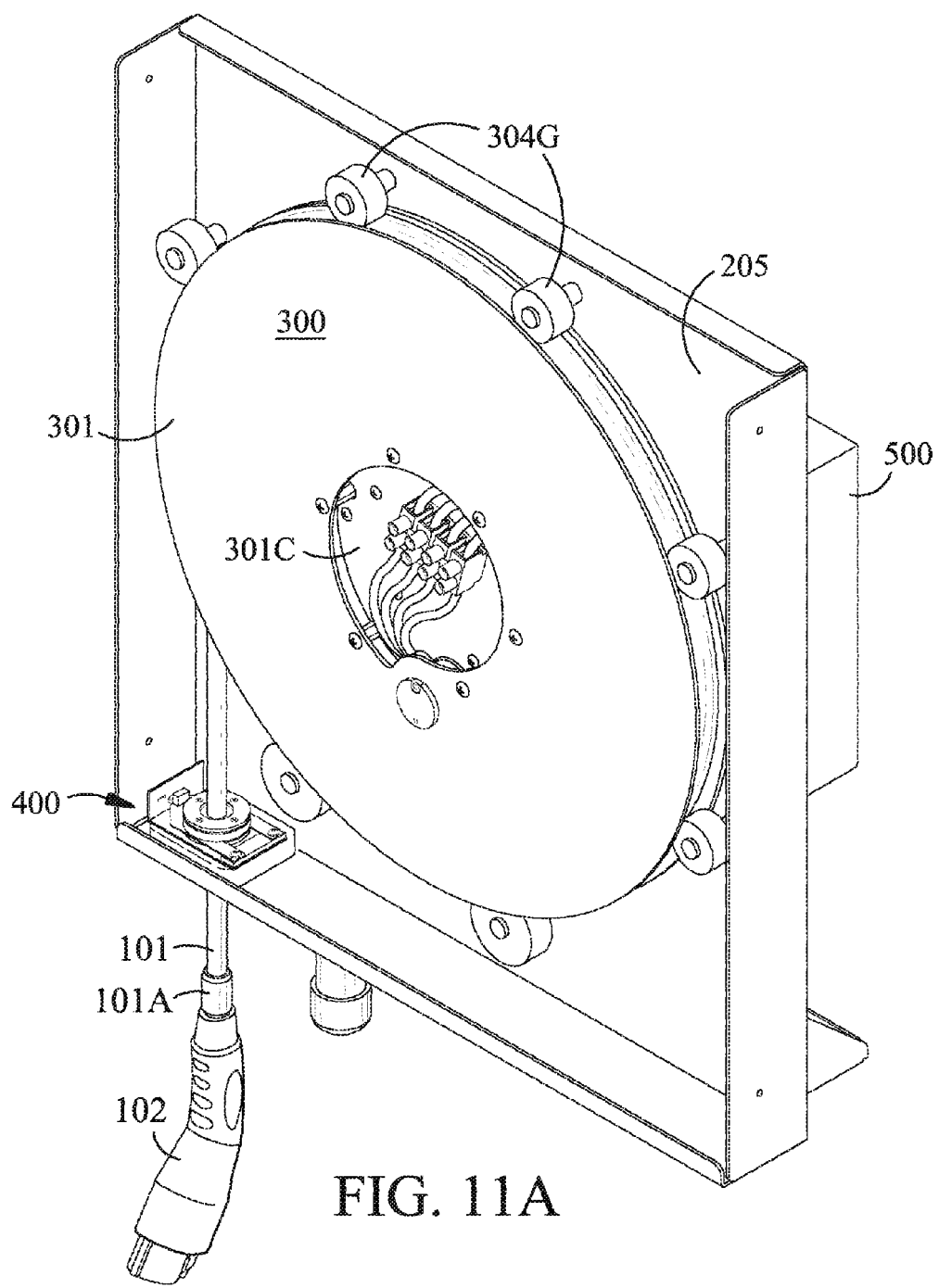
FIG. 11A is an isometric rear view of the wall mounted EVSE assembly with motorized cable retracting capabilities, with front and rear covers removed.
Figure 12:
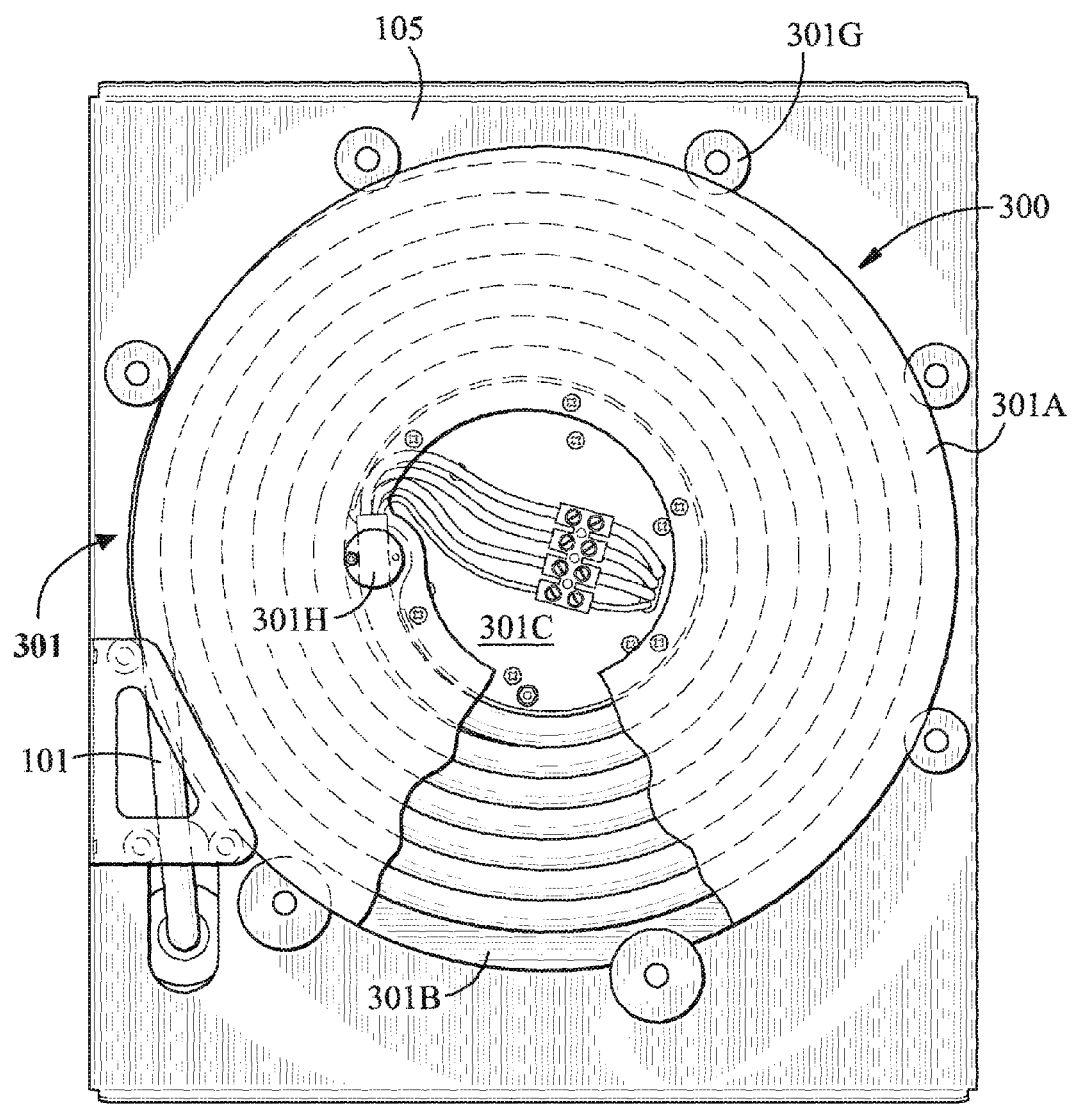
FIG. 12 is a top view of the power cable reel assembly with a partial cut away view of the power cable coiled on a hub mounted on a support deck.
Figure 12A:
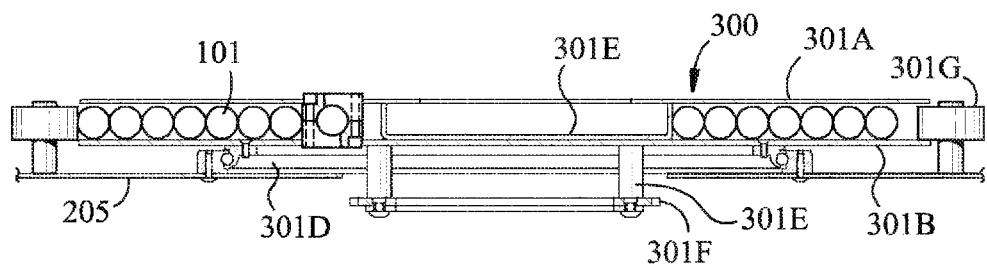
FIG. 12A is a side view of a power cable reel assembly mounted on the support deck.
Figure 12B:
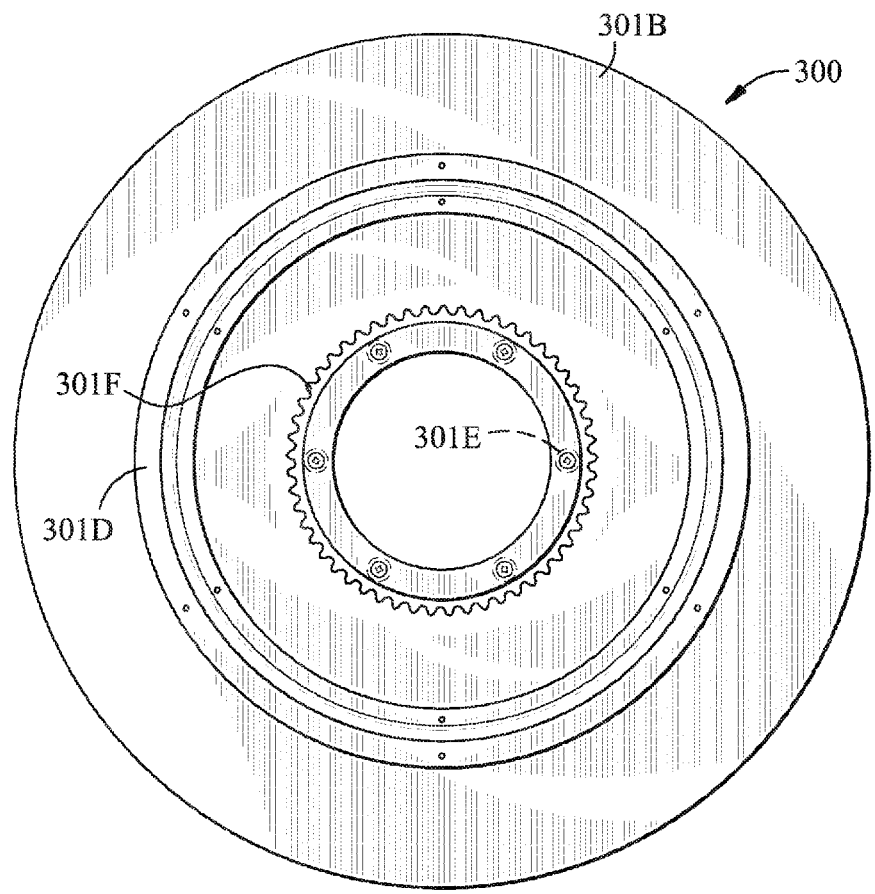
FIG. 12B is a bottom view of the power cable reel assembly mounted with the support deck removed.

Both the overhead mounted EVSE 100 (FIGS. 10, 10A) and the wall/pole mounted EVSE 200 (FIGS. 11, 12) employ the same internal motorized management system for winding and unwinding the power cable 101. The differences between EVSE 100 and EVSE 200 are the enclosures 103, 104 (FIG. 1) and 203, 204 (FIG. 2) and the cable exit points 401.

Figure 13:
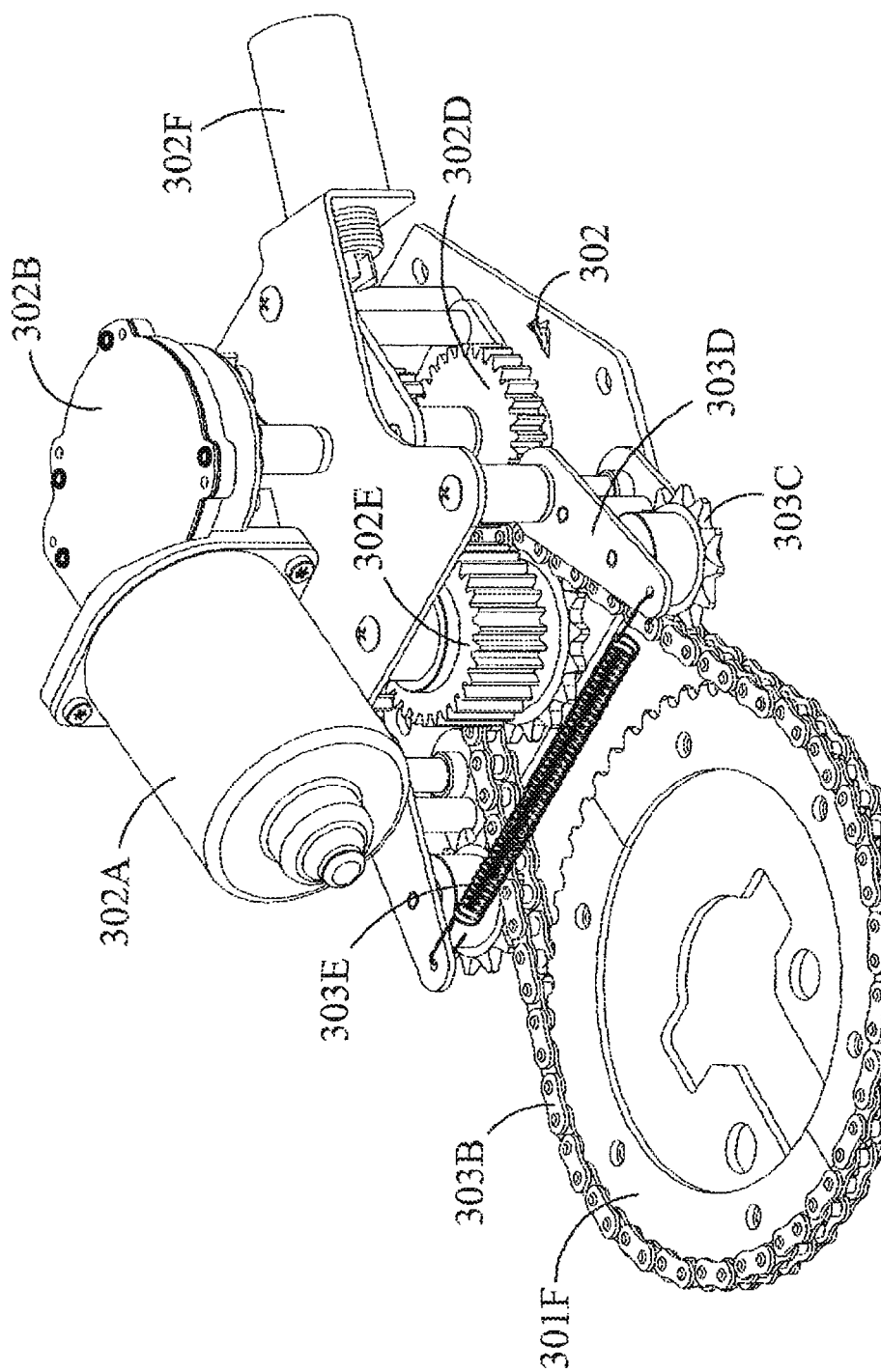
FIG. 13 is an isometric view of a motorized drive assembly, shown with the drive motor, solenoid and clutch plate assembly, drive gears, drive chain and drive sprocket.
Figure 18:
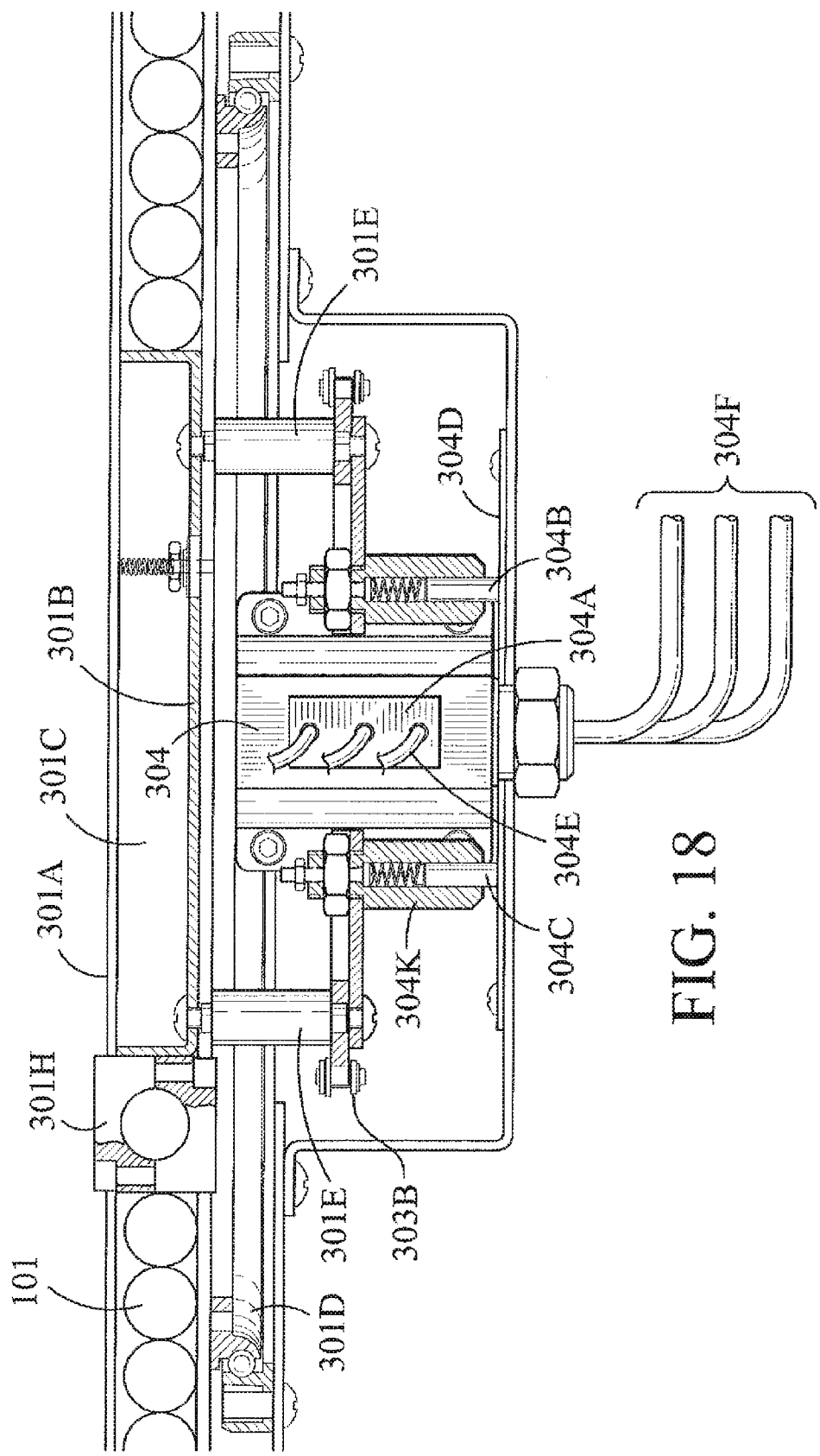
FIG. 18 is a side view of the slip ring assembly, with low voltage pilot and proximity rings, attached to the cable reel assembly.
Figure 19:
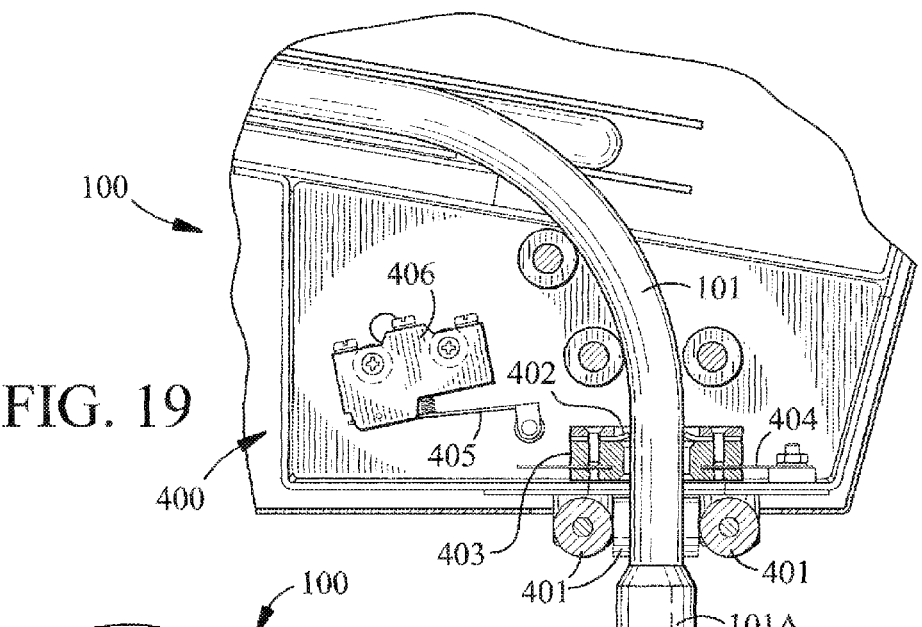
FIG. 19 is a side view, partly diagrammatic, of a home position sensor assembly showing a cable guide cleaner, a home sensor module, and a home sensing mechanical switch with the cable in the lowered (extended) position.
Figure 20:
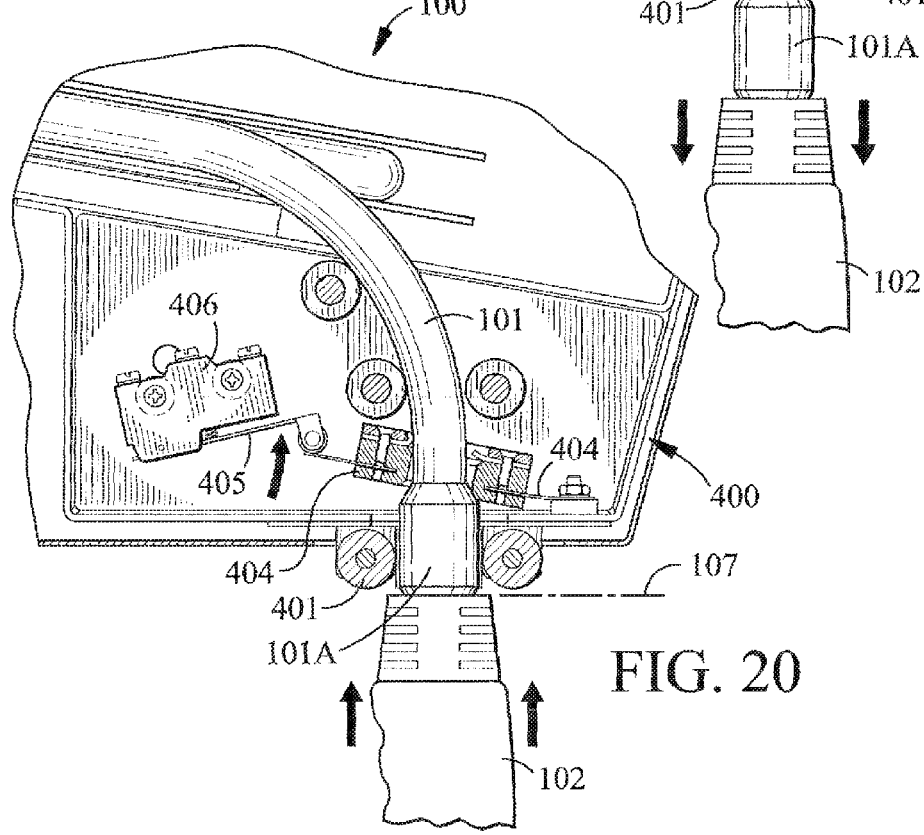
FIG. 20 is a side view, partly diagrammatic, of a home position sensor assembly showing the cable guide cleaner, home sensor module, and home sensing mechanical switch with the cable in the home position.

Both the overhead mounted EVSE 100 and the wall/pole mounted EVSE 200 employ the same internal mechanical assemblies, which include the following:

the cable reel assembly 300 (FIG. 12);
the motor clutch assembly 302 (FIGS. 10A, 11, 13);
the cable reel drive assembly 303 (FIGS. 13, 14);
the slip ring assembly 304 (FIGS. 17, 18); and
the home position sensor assembly 400 (FIGS. 19, 20).

Figure 21:
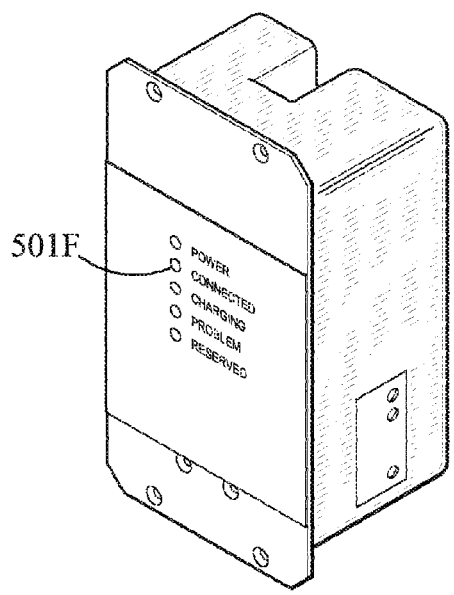
FIG. 21 is an isometric view of the EVSE display and communication module.
Figure 24:
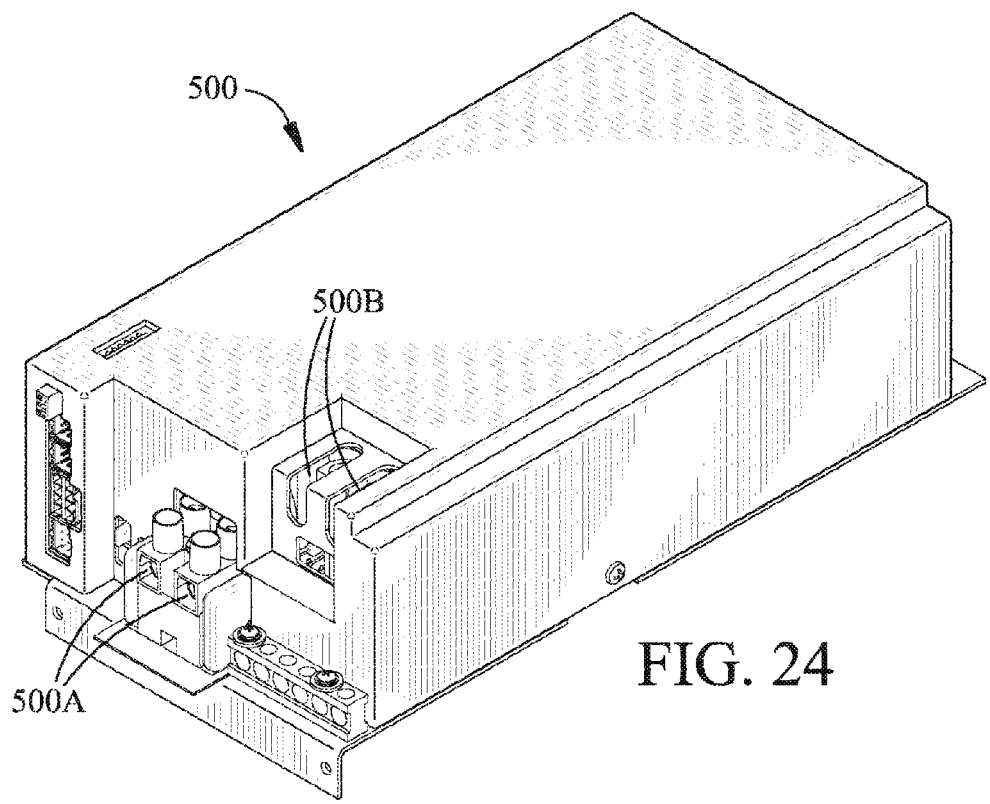
FIG. 24 is an isometric view of the EVSE, motor control, power control, and ground fault detection (GFCI) module.
Figure 25:
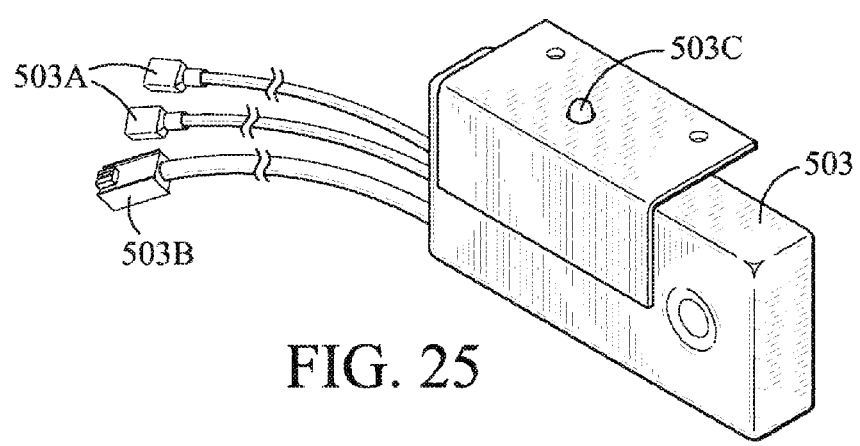
FIG. 25 is an isometric view of the EVSE, end user measuring device (EUMD) module.

Both the overhead mounted EVSE 100 and the wall/pole mounted EVSE 200 may employ the same electronic support modules, which may include one or more of the following:

the GFCI safety and control module 500 (FIG. 24);
the display and communication module 501 (FIG. 21);
the remote control receiver 502 (FIG. 22); and
the end user power measuring module 503 (FIG. 25).

Figure 37:
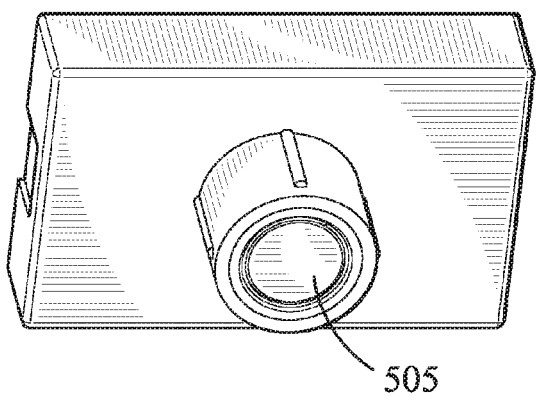
FIG. 37 is an isometric view of a remote control module having a vehicle sensor.
Figure 38:
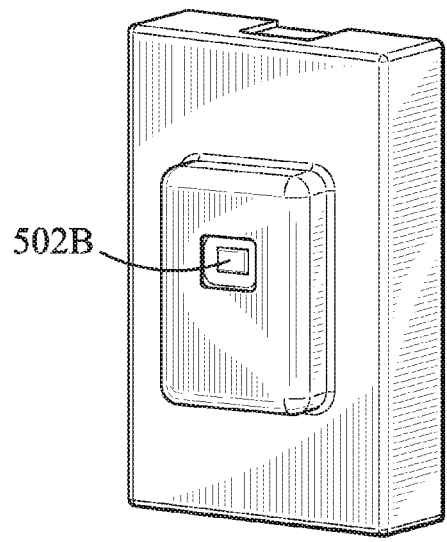
FIG. 38 is an isometric view of a remote control transmitter module.
Figure 39:
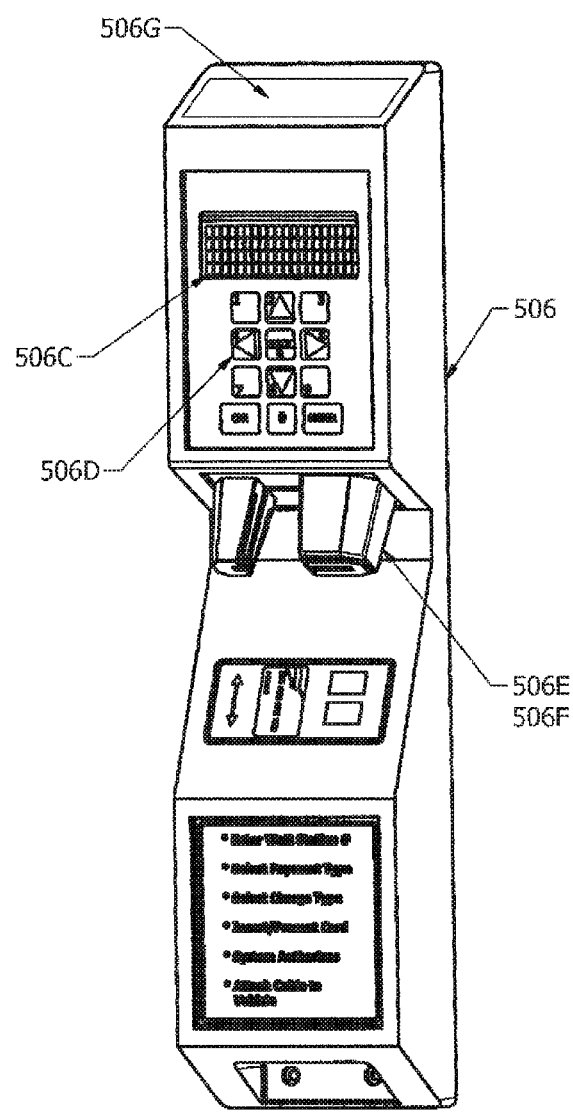
FIG. 39 is an isometric view of a remote control payment module.
Figure 40:
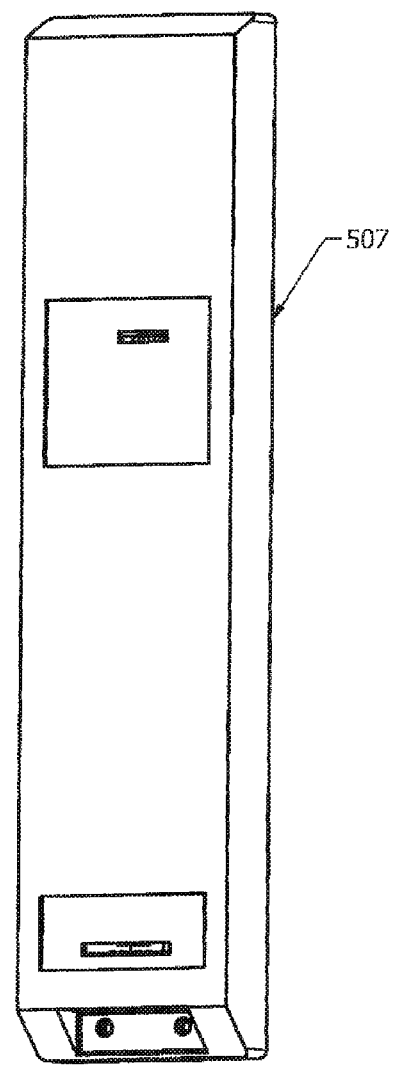
FIG. 40 is an isometric view of a remote control gateway module.

Both the overhead mounted EVSE 100 and the wall/pole mounted EVSE 200 may function with the same remote controls, which may include one or more of the following:

the control module 504 (FIG. 36);
the vehicle sensor 505 (FIG. 37);
the remote control transmitter 502B (FIG. 38);
the payment station 506 (FIG. 39); and
the gateway module 507 (FIG. 40).

The cable reel assembly 300 (FIG. 10A), includes a cable reel 301, a hub 301C, a ring bearing 301D (FIG. 13A), a reel drive sprocket 301F, six drive posts 301E, and four cable guide spindles 301G.

The motor and clutch assembly 302 (FIGS. 13, 13A, 14) includes a drive motor 302A, a drive motor worm gear 302B, a pinned drive gear 302C, a motor drive gear with a clutch bearing 302L, idler gears 302D, 302K, a sprocket drive gear 302E, a clutch solenoid 302F, and clutch plates 302J.

The cable reel drive assembly 303 includes a drive sprocket 303A, a drive chain 303B, and drive chain tension sprockets 303C.

The slip ring assembly 304 (FIGS. 17, 18) includes a high voltage brush assembly 304A and two low voltage brush assembly 304K.

The home position sensor assembly 400 (FIGS. 19, 20) includes four cable guide rollers 401, cable brush cleaners 402, a home sensor lift ring 403, and mechanical limit switch 406.

The safety and control module 500 (FIGS. 9, 24) includes a central processing unit 500C, a current measuring circuit 500D, a ground fault detection circuit 500E, and a circuit interrupter 500F.

Functional Description

Figure 35A:
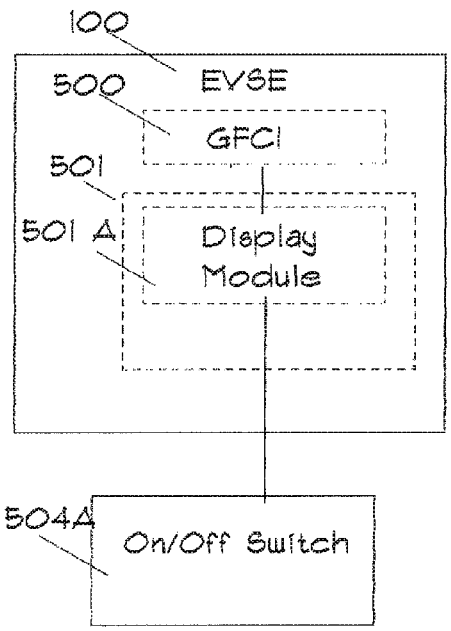
FIG. 35A is a block diagram of an EVSE configured with a remote on/off control button.
Figure 35B:
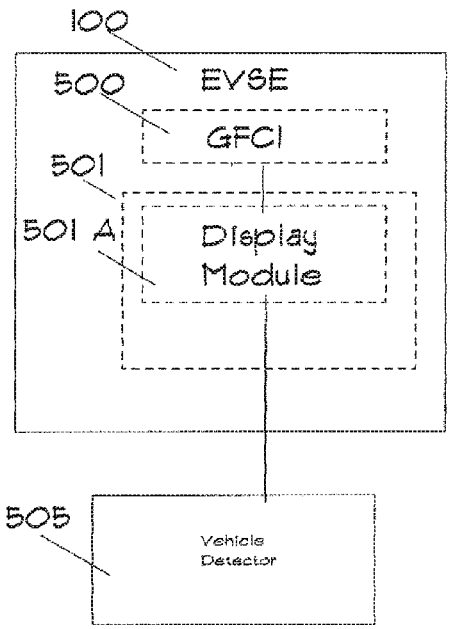
FIG. 35B is a block diagram of an EVSE configured with a remote control vehicle detector.
Figure 35:
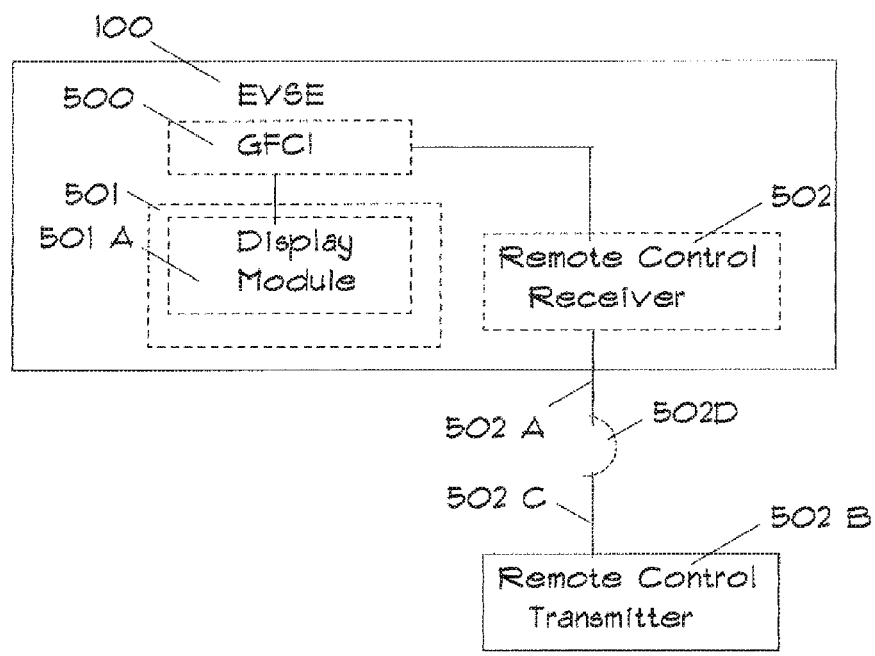
FIG. 35C is a block diagram of an EVSE configured with a wireless remote control on/off button.
FIG. 35D is a block diagram of an EVSE configured with a remote on/off button and a RFID card or FOB reader control.
FIG. 35E is a block diagram of two or more EVSEs hardwired to a gateway module, communicating with a central host computer via a wide area network and being controlled by a user's cell phone.
FIG. 35F is a block diagram of two or more EVSEs, communicating with a gateway module, using a wireless ZigBee mesh network, in turn the gateway is communicating with a central host computer, via a wide area network and being controlled by a user's cell phone.
FIG. 35G is a block diagram of two or more EVSEs, hard wired to a payment station, communicating with an being controlled by a central host computer via a wide area network (cloud)
FIG. 35H is a block diagram of two or more EVSEs, communicating with a payment station, using a wireless ZigBee mesh network, and in turn the payment station is communicating with and being controlled by a central host computer via a wide area network (cloud)
Figure 35D:
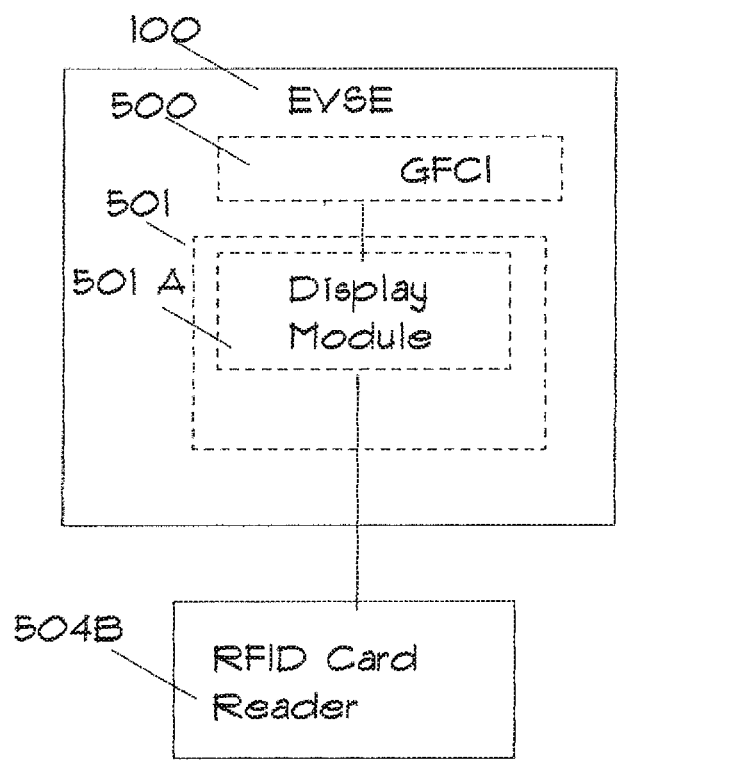
Figure 36:
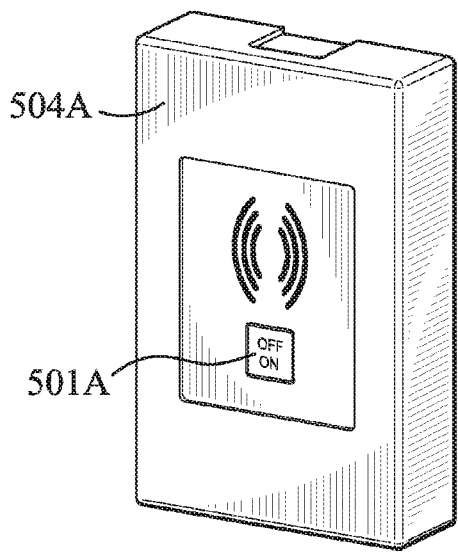
FIG. 36 is an isometric view of a remote control module having on/off push button and/or a non-contact card or fob reader.

The following description describes the sequence of events that would take place during an electric car charging cycle. What is described, but not limited to, is an overhead ceiling mounted electric vehicle service equipment (EVSE) with a motor driven cable management system 100 (FIG. 1) being activated by a simple on/off push button switch 504A (FIGS. 35A, 36).

Figure 5:
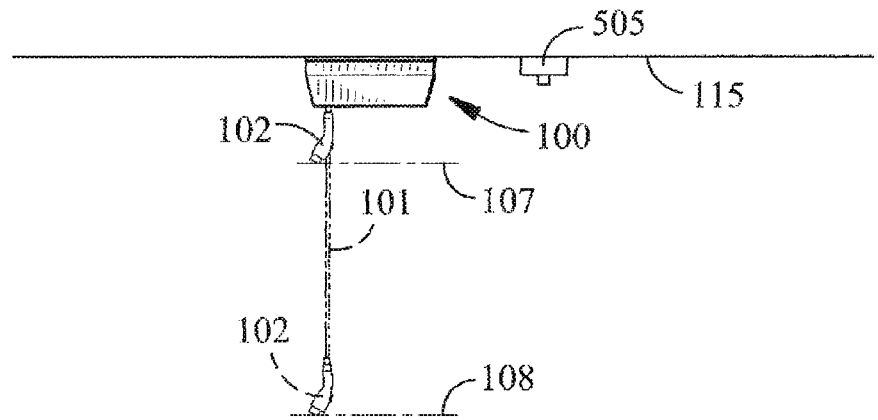
FIG. 5 is an elevation view of a ceiling mounted EVSE showing the cable and connector at its stored (home) position and at its lowered (ADA access height) position.

With additional reference to FIG. 33, each time primary power is applied at 701A to the EVSE 100, the central processor unit 500C (FIG. 9) test signal 703A for the home sensor 400 limit switch 406 determines if the connector 102 is in the home locked position 107 (FIG. 5).

When the connector 102 is in the home locked position 107 (FIG. 5), EVSE 100 is ready for service.

When the connector 102 is not in the home locked position, 107 (FIG. 5), the central processor unit 500 C (FIG. 9) energizes via signals 708A, 706A, the clutch solenoid 302F and the drive motor 302A for clockwise rotation 707A, and the maximum cable retract timer 715A is started. When the clutch solenoid 302F is energized rotating the clutch plate assembly 302J around pivot shaft 302I, the retracted idler gear 302K engages the motor drive gear 302C with the sprocket drive gear 303E. The sprocket drive gear 303E drives an attached drive sprocket 303A, which drives a drive chain 303B with a clockwise rotation 302N. The drive chain 303B in turn drives the cable reel assembly 301 in a clockwise rotation.

When the cable reel assembly 301 is driven with a clockwise rotation, the power cable 101 winds onto the reel hub 301D, until the power cable home ring 101A, reaches and lifts the home sensor lift ring 403 (FIG. 20). The latter in turn raises the lever arm of the mechanical limit switch 406, signaling at 703B (FIG. 33) of the central processor unit 500C to remove the power 708B, 706B from the clutch solenoid 302F and the drive motor 302A. The connector 102 is now locked at the home position 107 (FIG. 5) and ready for service.

When a driver parks the electric vehicle 600 under the overhead EVSE 100, and in this case presses the on push button switch 504A for service, an authorization signal 704 is sent to the central processing unit 500C. The central processor unit 500C (FIG. 9) energizes power 706B to the drive motor 302A for counterclockwise rotation 707C (FIG. 33), and starts the cable extension timer 705A.

Figure 13A:
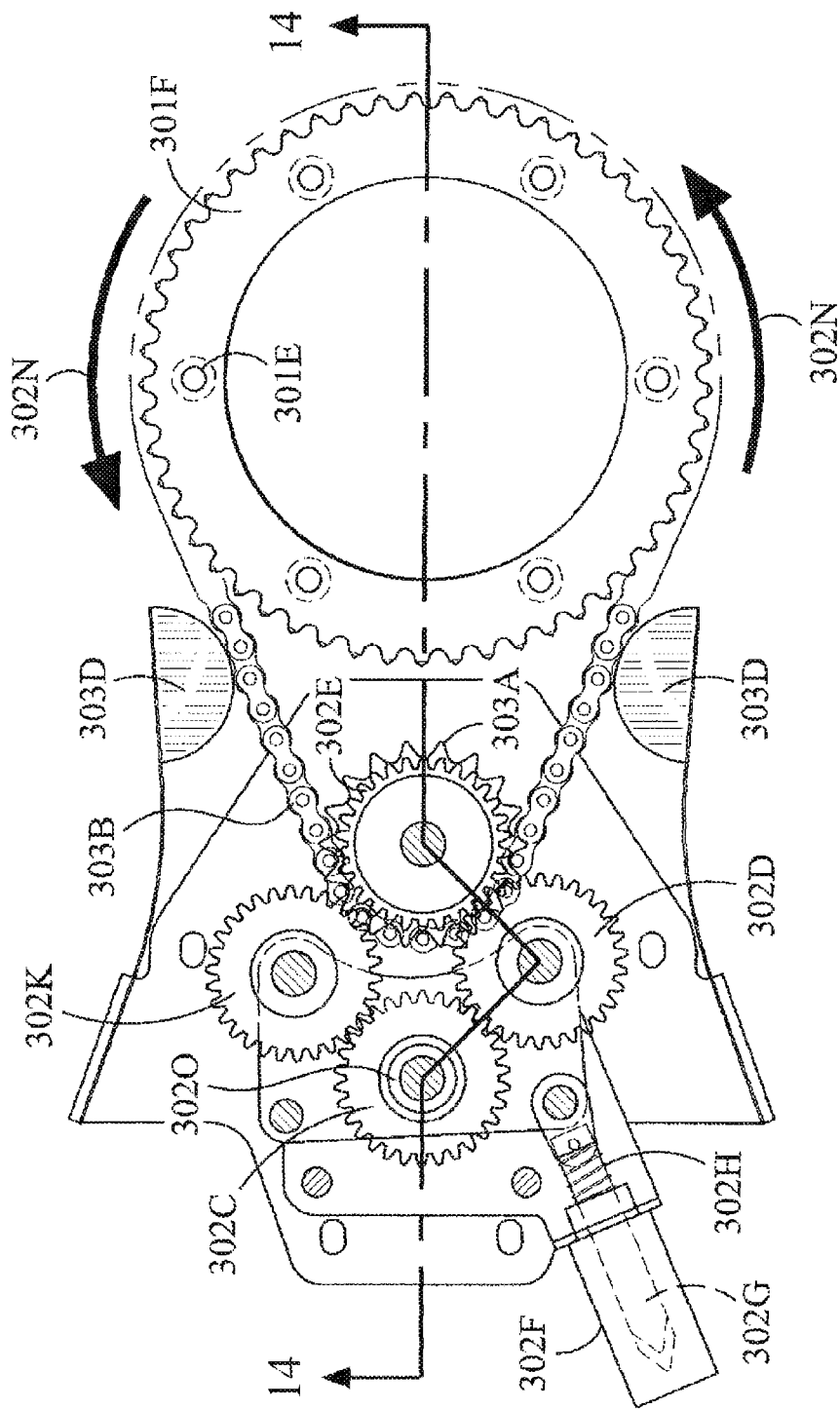
FIG. 13A is a top view of the motorized cable and a drive assembly with a solenoid clutch plate assembly, with gears engaged in the extend configuration.
Figure 14:
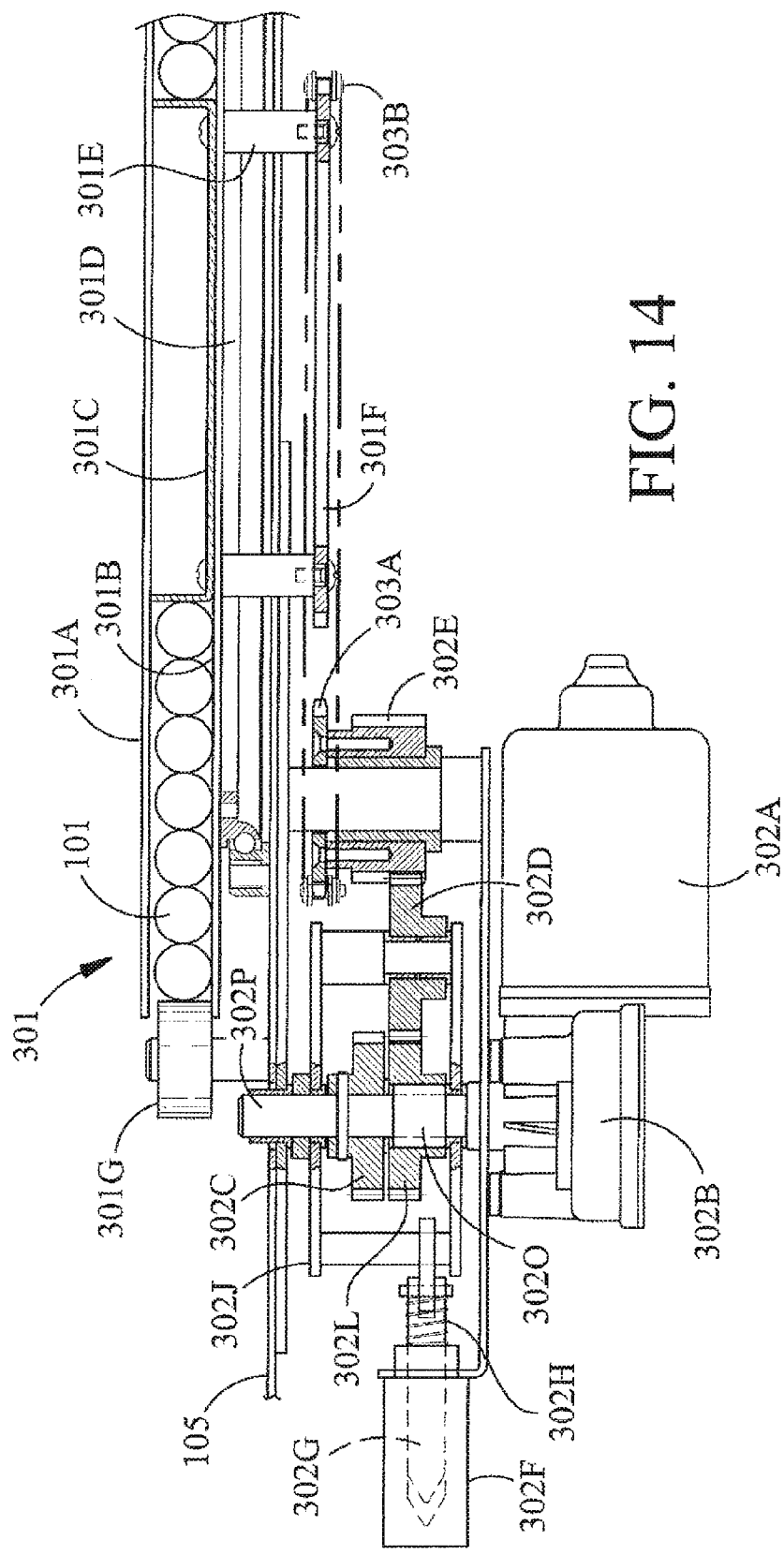
FIG. 14 is a side sectional view of the motorized cable and a drive assembly taken along the lines 14-14 of FIG. 13A, shown with solenoid clutch plate assembly gears engaged in the extend configuration.
Figure 15:
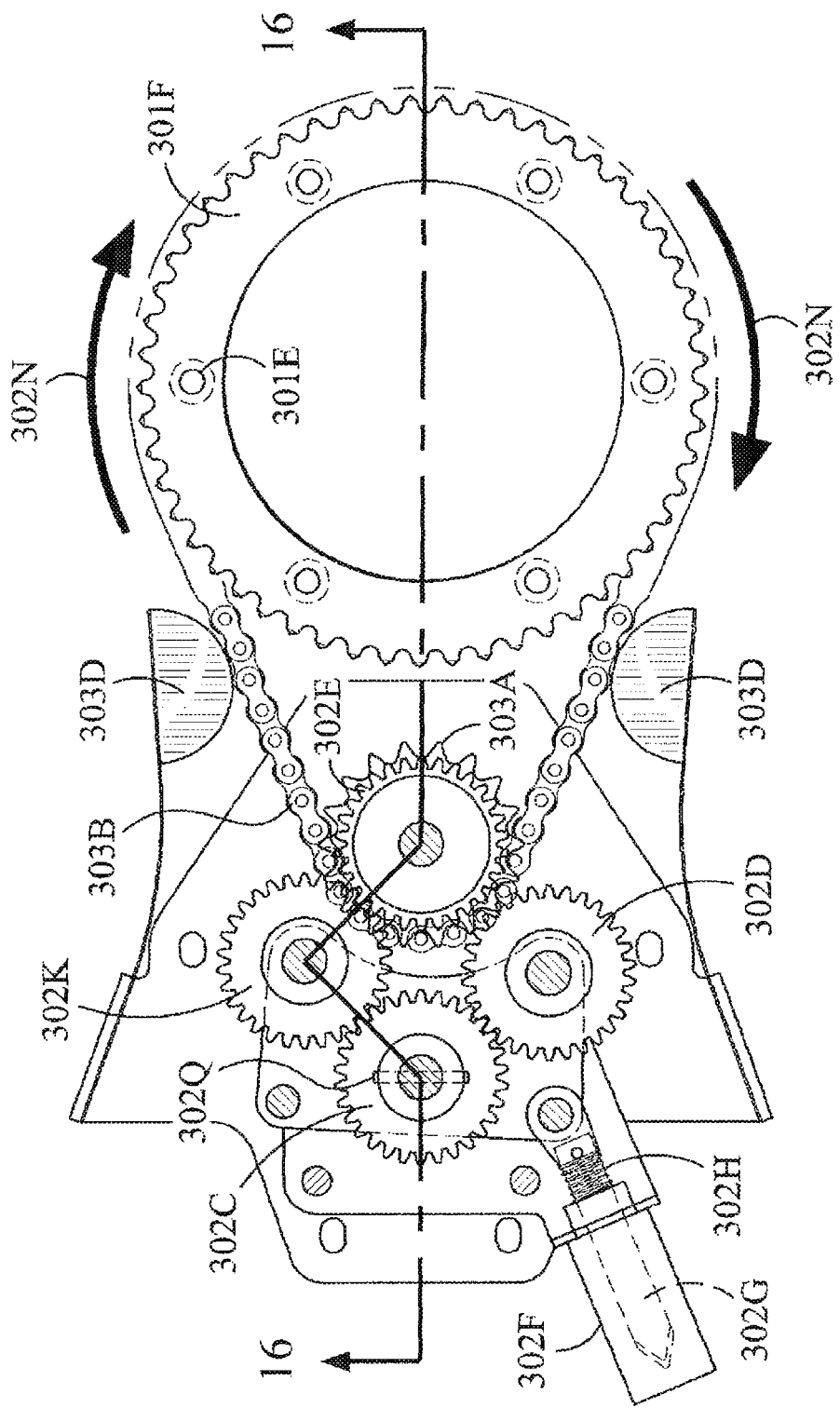
FIG. 15 is a top view of the motorized cable and a drive assembly with a solenoid clutch plate assembly having gears engaged in the retract configuration.

When the drive motor 302A is energized 706C, the clutch solenoid spring 302H will rotate the clutch plate assembly 302J around pivot shaft 302I disengaging the retract idler gear 302K and engaging the extend idler gear 302D with the motor drive gear with clutch barring 302L and the sprocket drive gear 303E (FIGS. 13A, 14). The sprocket drive gear 303E drives the attached drive sprocket 303A, which in turn drives a drive chain 303B with a counterclockwise rotation 302M. The drive chain 303B in turn drives the cable reel assembly 301 in a counterclockwise rotation. When the cable reel assembly 301 is driven with a counterclockwise rotation, the power cable 101 unwinds from the reel hub 301D, until the cable extended timer 705 times out at 705B. At that time, the power connector 102 would have reached the required ADA height 108 (FIG. 5) above the floor 112.

Figure 6:
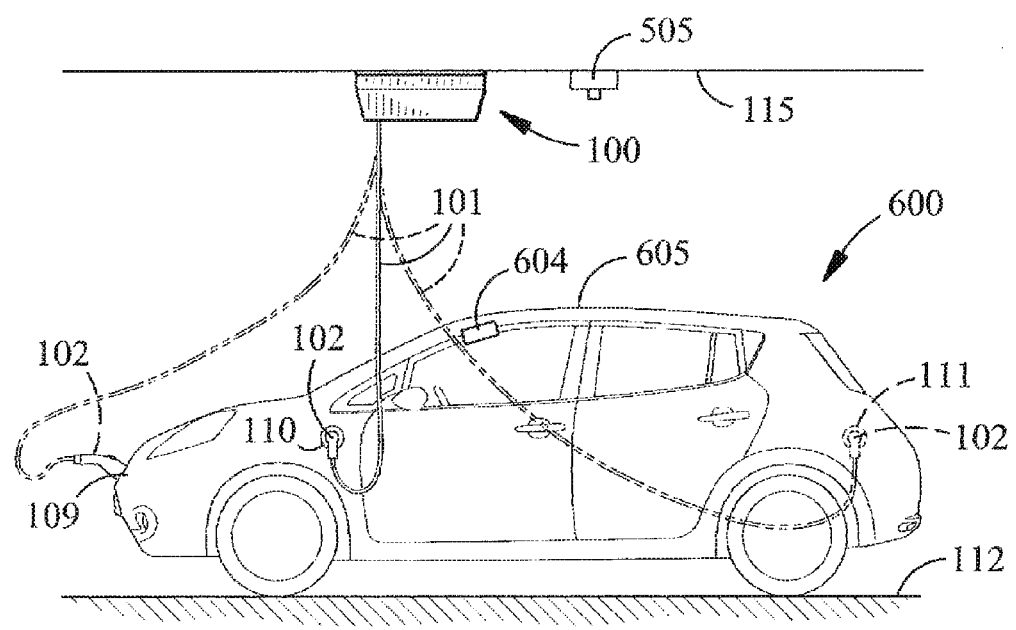
FIG. 6 is an elevation view of a ceiling mounted EVSE showing the extent of the cable and connector attached to an electric vehicle at three different inlet positions.
Figure 6:
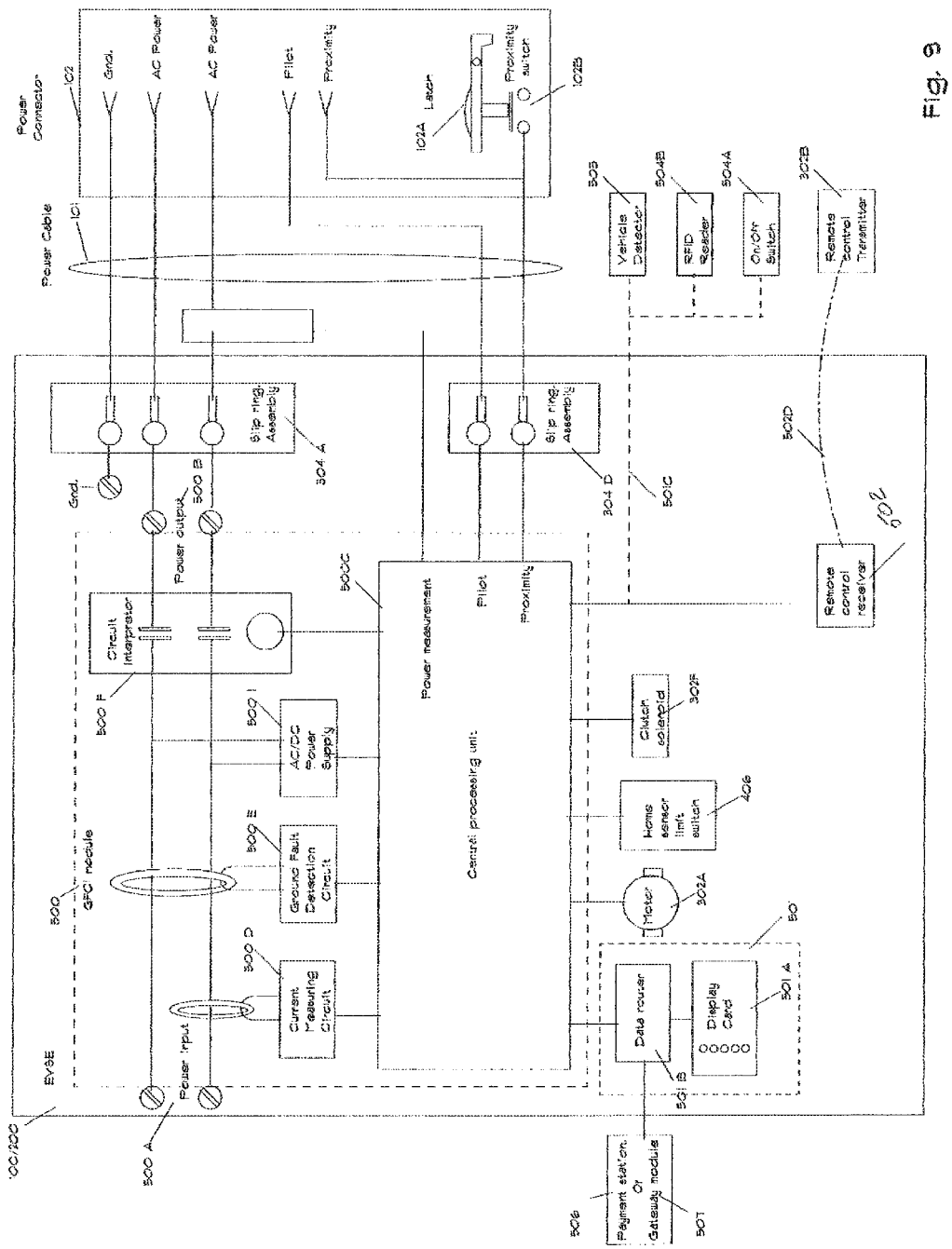

When the power cable 101 is being lowered or when the power connector 102 reaches the ADA height 108 (FIG. 5), it is necessary that the power cable 101, with its power connector 102, are free to be manually extended to the extent of the cable length 109, 110, 111 (FIG. 6). To achieve this requirement, the motor and clutch assembly 302 employs the use of a clutch bearing 302O.

The key feature is the combination of a clutch bearing 302O attached to the motor drive gear 302L. The clutch bearing 302O has the unique feature of locking to the motor shaft 302P when driven in a counterclockwise direction 302M and slipping when driven in the clockwise direction.

When the clutch solenoid 302F is not energized and drive motor 302A is energized so that the drive motor shaft 302P turns in a counterclockwise (CCW) rotation 302M (FIG. 14), the motor drive gear with the clutch bearing 302L, will rotate counterclockwise, driving the extend idler gear 302D with a clockwise rotation. The extend idler gear 302D, which is engaged with the sprocket drive gear 302E, will drive the sprocket drive gear 302E and its attached drive sprocket 303A counterclockwise at 302M. The drive sprocket 303A will drive the drive chain 303B with a counterclockwise rotation, turning the reel drive socket 301F and its attached cable reel assembly 301 (FIG. 13A) with a counterclockwise rotation 302M (FIG. 14). When the cable reel 301 rotates in a counterclockwise rotation 302M (FIG. 14), the power cable 101 will unwind from the cable reel 301 and lower the power connector 102.

As the cable 101 is unwound from the cable reel 301, cable spindles 301G prevent cable 101 from dragging on the internal frame 105. This friction would cause the cable 101 to uncoil inside the cable reel 301 instead of lowering power cable 101 and power connector 102.

While the power cable 101 is being lowered or when the power connector stops at the ADA height, power cable 101 is free to be extended by manually pulling on the power cable 101 or power connector 102. This is possible because the drive gear with the clutch bearing 302L is free to rotate CCW on the motor shaft 302P. Pulling on the power cable 101 will rotate the cable reel 301 CCW, in turn rotating the drive chain 303B CCW. The latter rotates the drive sprocket 302E CCW, which rotates the extend idler gear 302D CW, which rotates the motor drive gear with the clutch barring 302L CCW on the motor shaft 302P. The motor drive gear with clutch barring 302L is free to rotate CCW on the motor shaft 302P when the power cable 101 is extended by manually pulling on the power cable 101 or power connector 102.

Figure 34A:
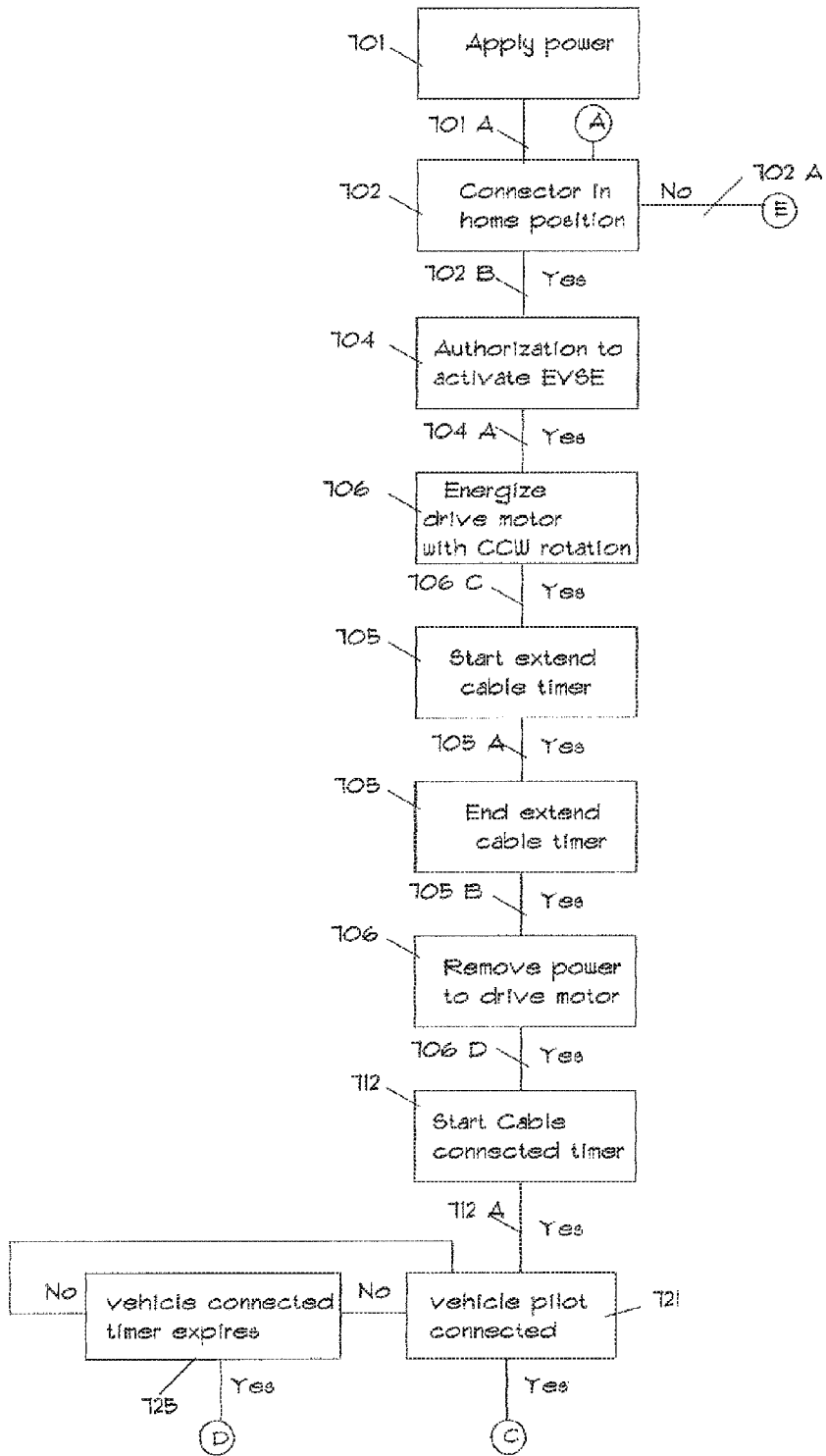
FIGS. 34A-34B are each a flow diagram of the cable management motor drive system for the EVSE.
Figure 34B:
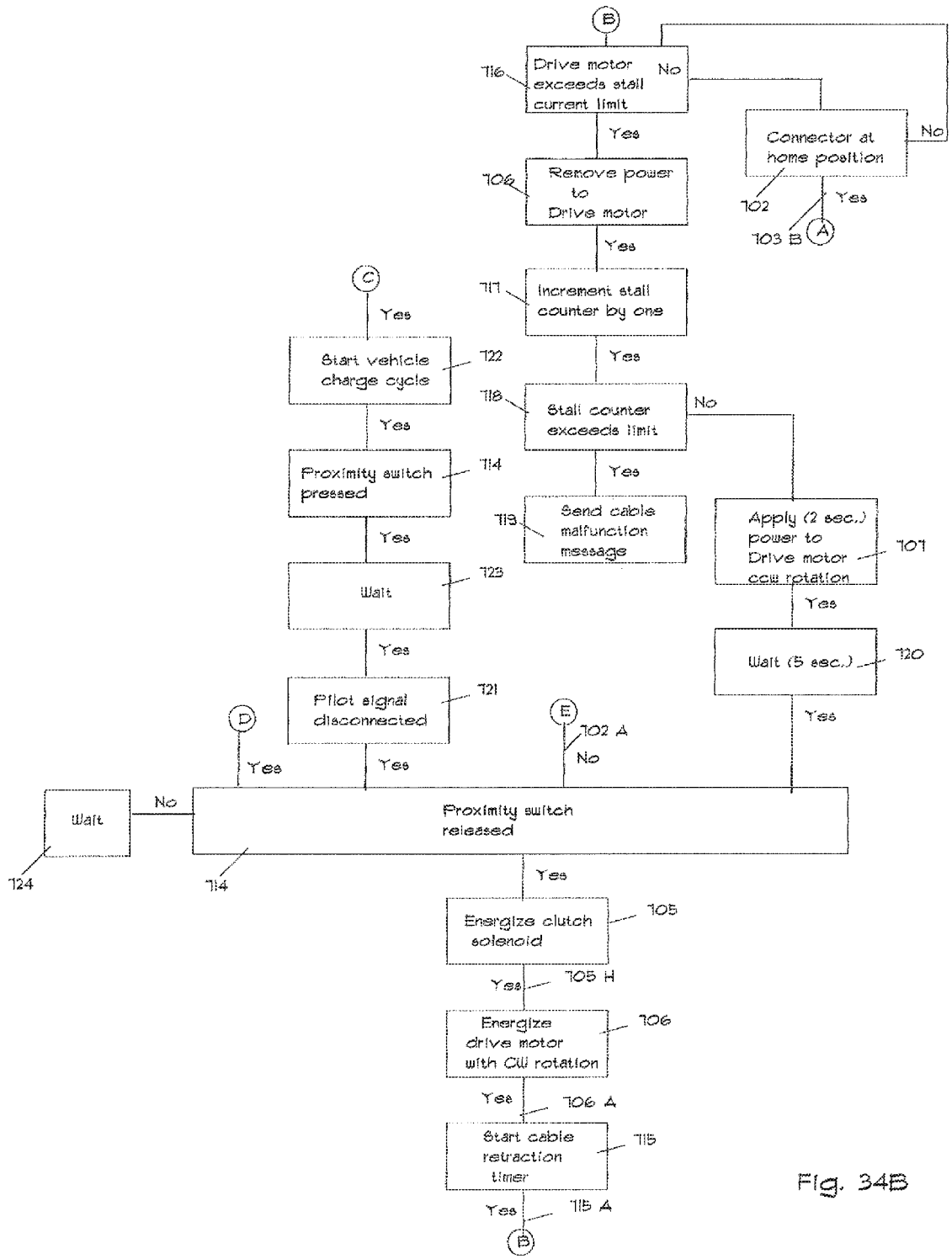
Figure 35E:
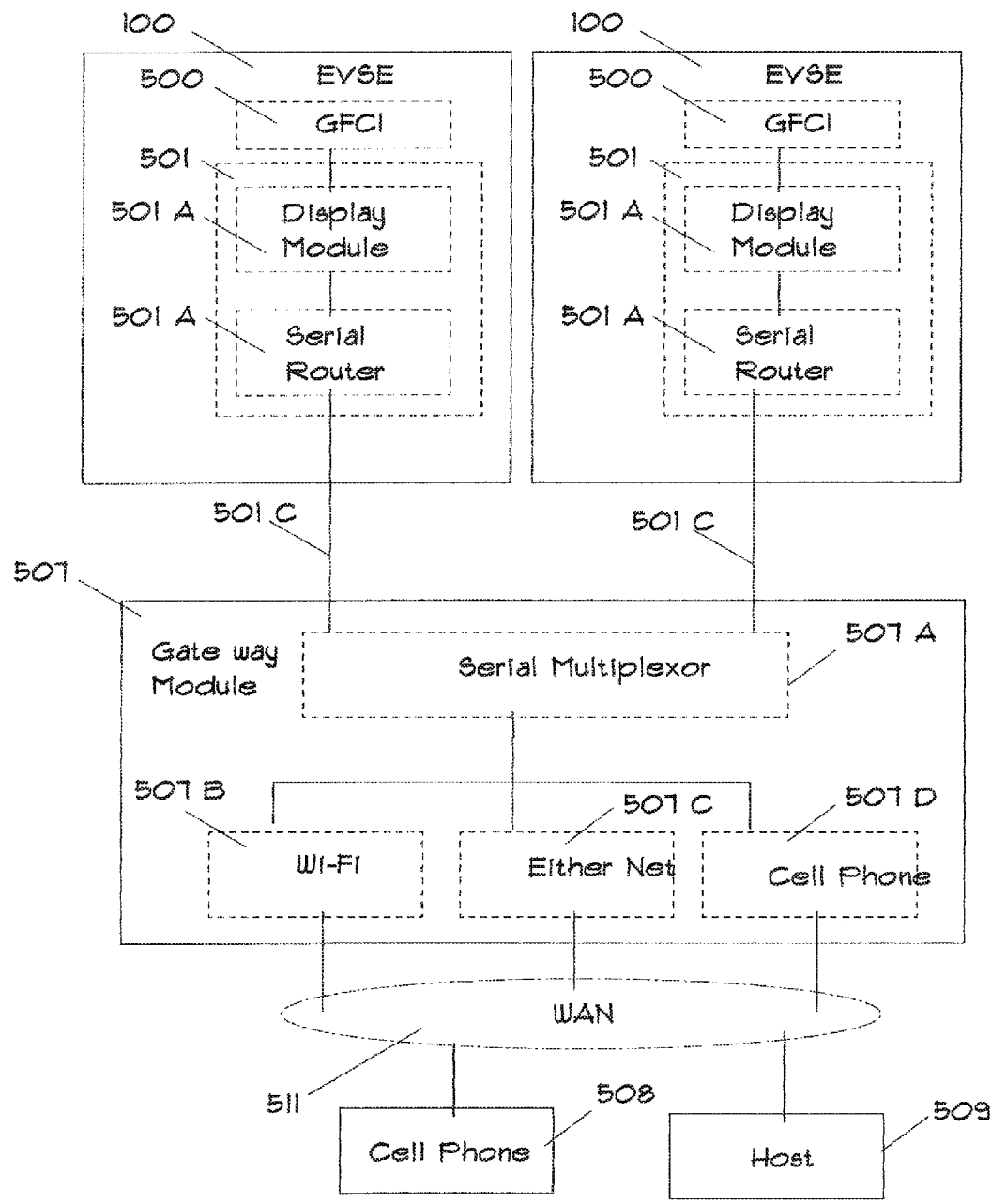
Figure 35F:
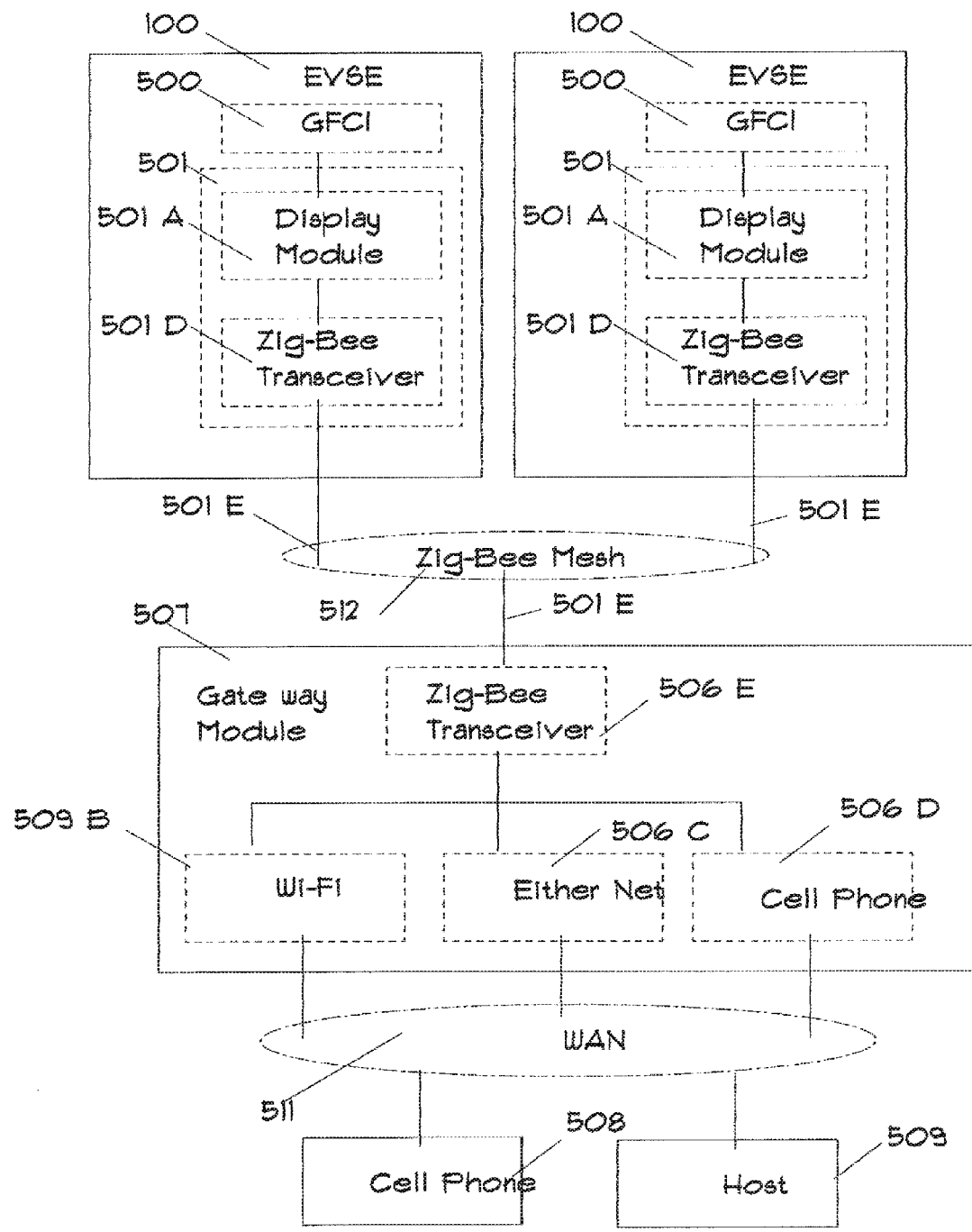
Figure 35G:
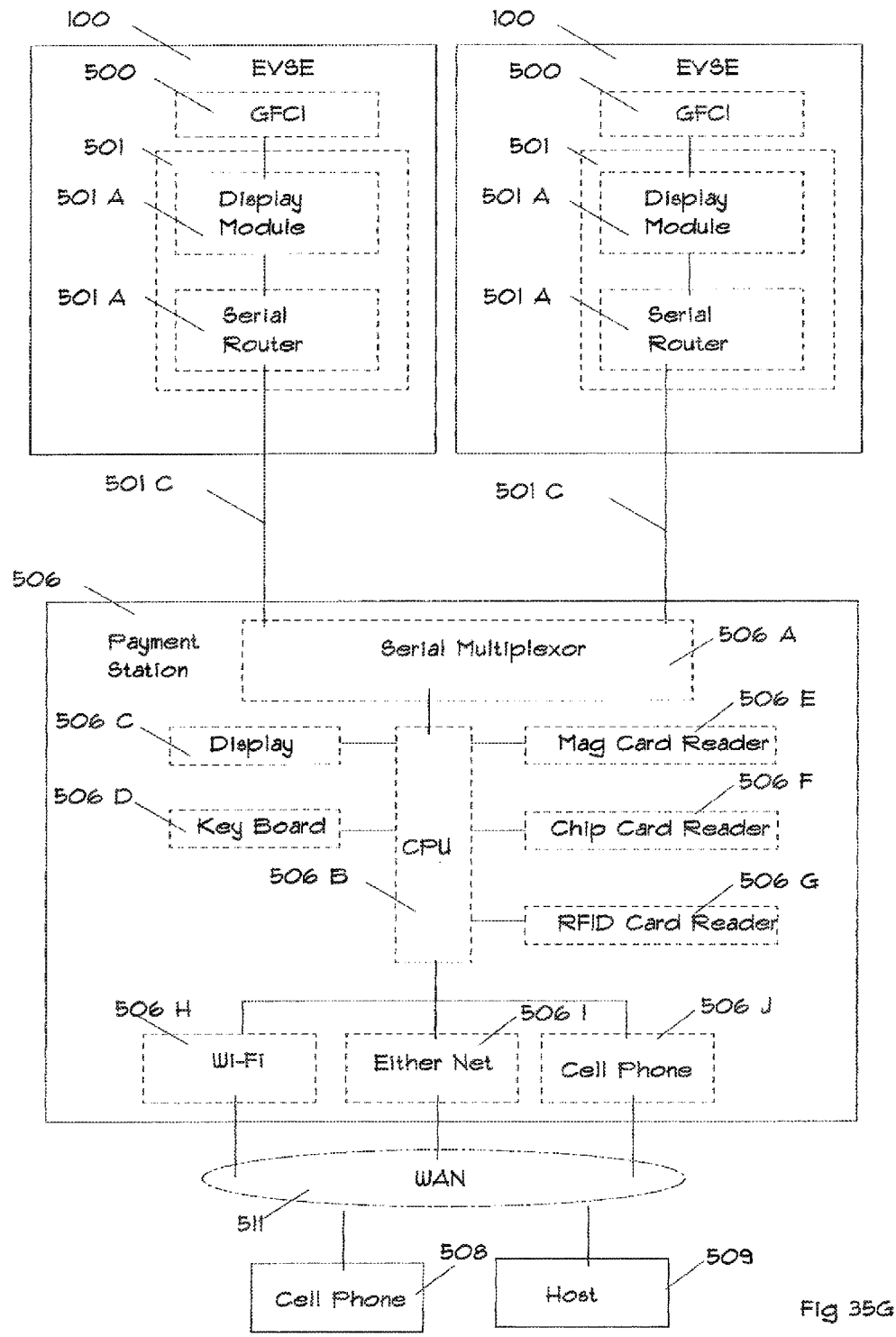
Figure 35H:
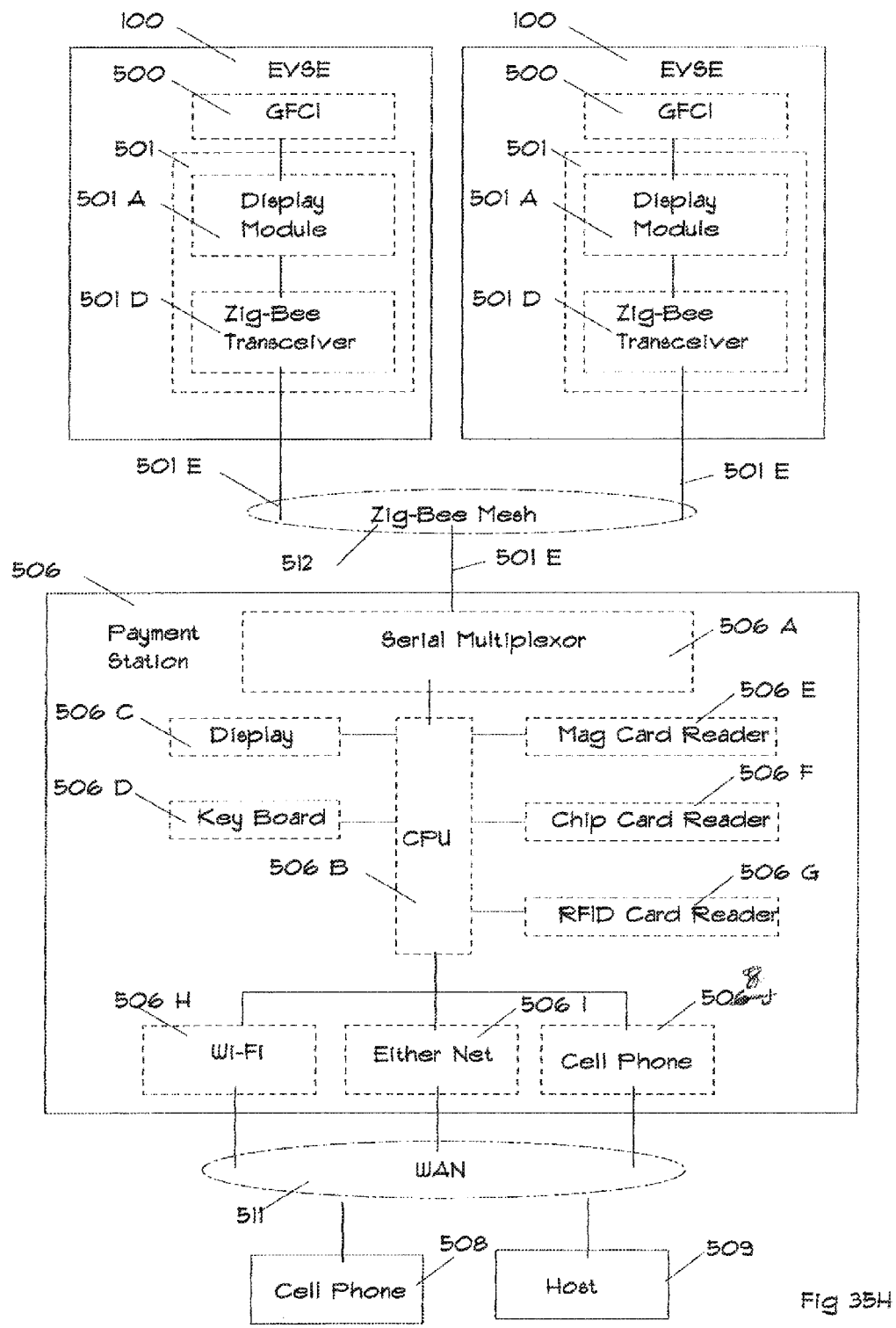

When the power cable 101 and the power connector 102 are lowered at 707C, a cable connected timer is started at 712A (FIG. 33). If the cable connected timer expires 725 (FIG. 34A) before the power connector 102 is attached to the electric vehicle 600, and the power connector latch 102A is not pressed 714, then the clutch solenoid 302A is energized 708C and the drive motor is energized 706E with a clockwise rotation 707E. The cable retracted timer is started at 715C and the power cable 101 is wound up on to the cable reel 301 until the home sensor limit switch 406 detects at 703D that the power connector is at the home position 107. If the drive motor current exceeds the stall limit 716 then the voltage is removed from the drive motor and the stall counter is incremented by one count 717. If the stall counter does not exceed the abort limit 718, then the drive motor 302D is powered for two seconds with a counterclockwise rotation at 302M to free the power connector 102. After a wait period 720, another attempt is made to retract the power cable 101 and power connector 102. When the stall counter exceeds its limit, a malfunction message is sent to the service center host 509 (FIG. 35H).

When the power connector 102 is connected to the inlet 109, 110, or 111 of the electric vehicle 600 and the pilot 500C and proximity 500H signals are received by the central processing unit 500C, the circuit interrupter 500F will be closed applying power to the electric vehicle 600.

When the charging session is completed, and the latch button 102A is pressed, the proximity switch 102B opens. The central processing unit 500C receives a signal that the power connector 102 is about to be removed to thereby disconnect the power to the electric vehicle 600. When the power connector 102 is removed from the electric vehicle inlet 109, 110, or 111, the pilot signal will be removed, indicating that the power connector is out of the inlet on the electric vehicle. However, the power cable 101 will not be retracted until the pressure is removed from the latch button 102A on the power connector 102.

Again when the power connector latch 102A is released at 714, the clutch solenoid 302A is energized 708C, and the drive motor is energized 706E with a clockwise rotation 707E. The cable retracted timer is started at 715C, and the power cable 101 is wound up on to the cable reel 301 until the home sensor limit switch 406 detects at 703D that the power connector is at the home and locked position 107.

Description of Mechanical Assemblies

Figure 4:
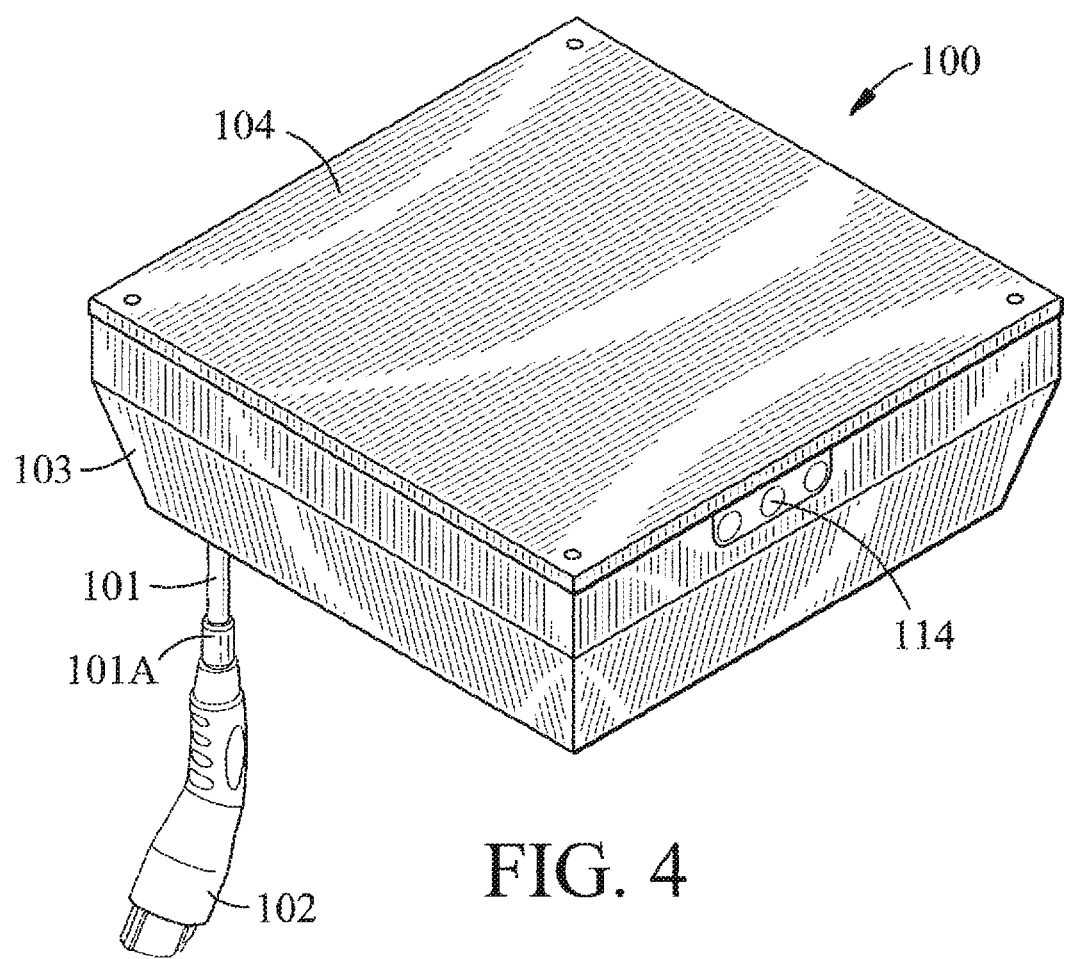
FIG. 4 is an isometric top view of the overhead EVSE assembly with motorized cable retracting capabilities and its power connector in the home locked position.
Figure 27:
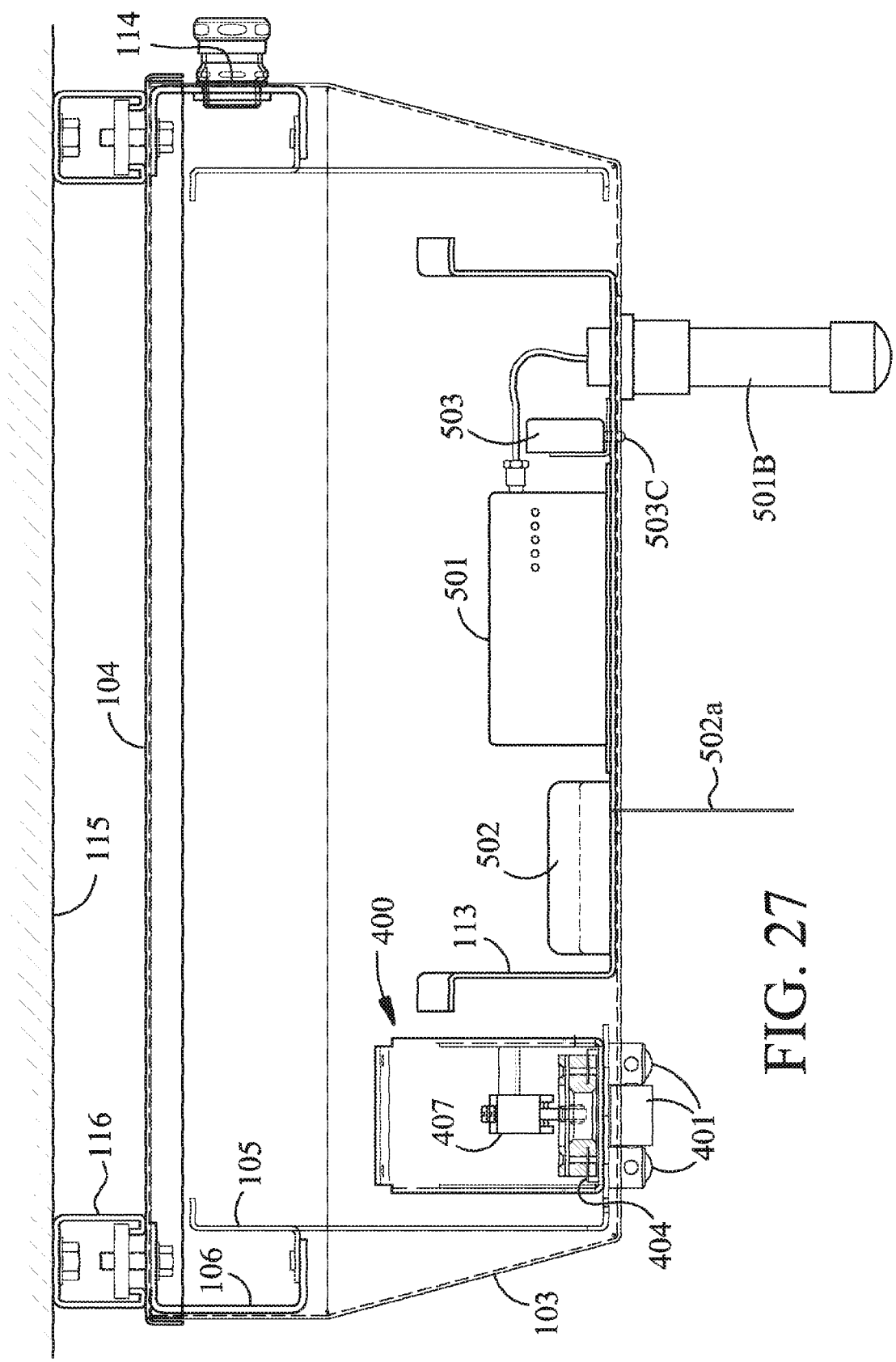
FIG. 27 is an end view, partly diagrammatic, of home sensing assembly with a mechanical home sensing switch, remote control module and a display/communication module.
Figure 28:
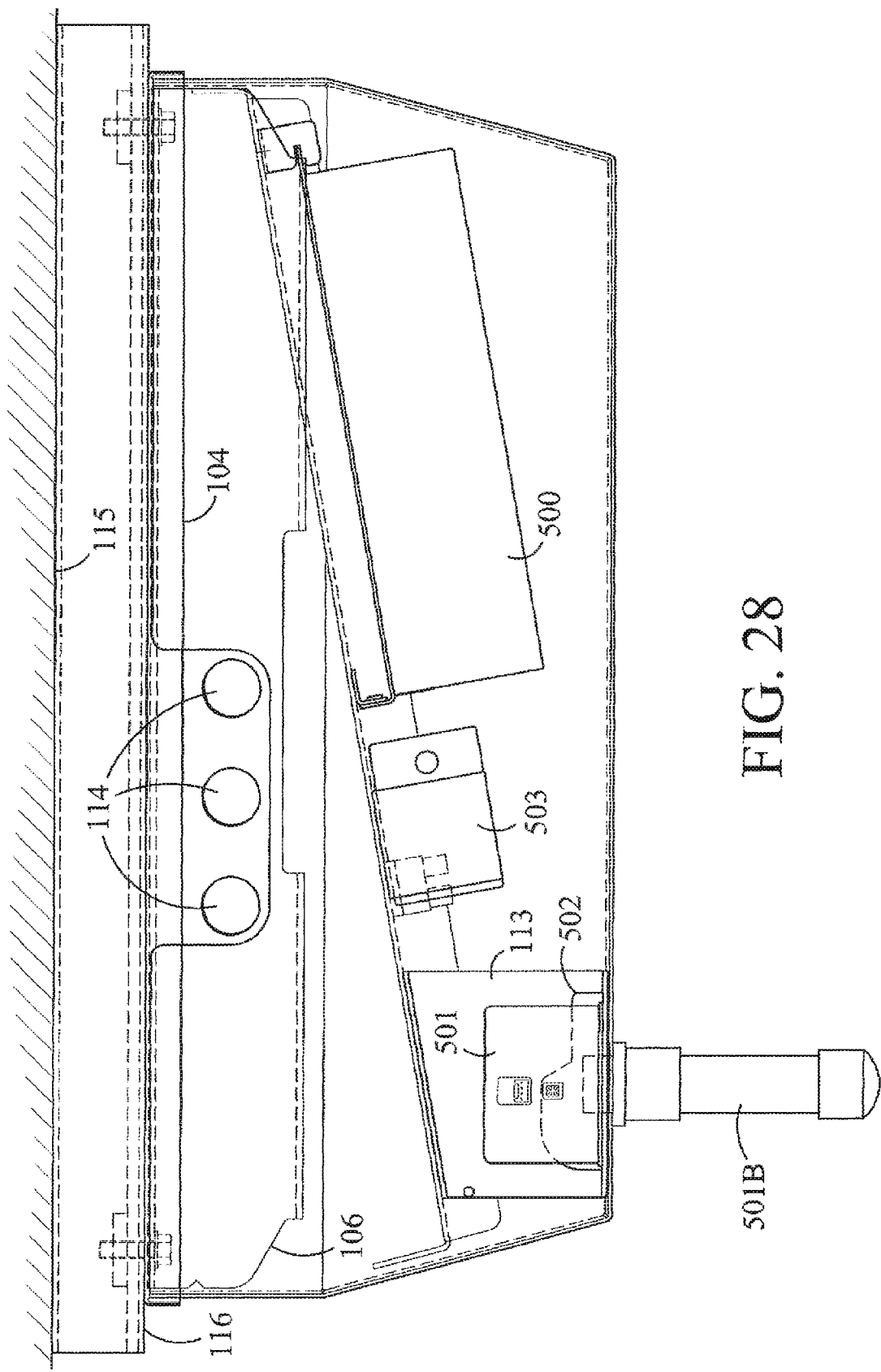
FIG. 28 is a side view, partly diagrammatic, of a display/communication module, a EUMD module, and the side view of the GFCI module.
Figure 31:
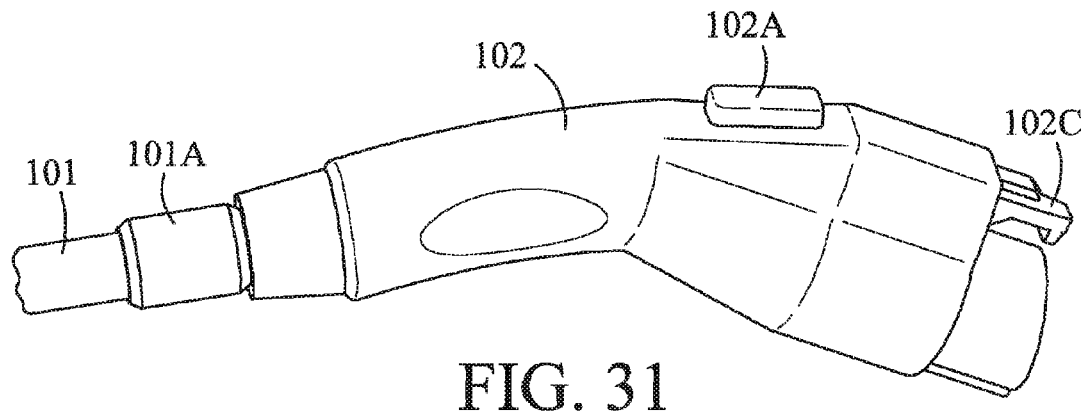
FIG. 31 is a side view of an EV power connector which mounts to the end of the cable.
Figure 32:
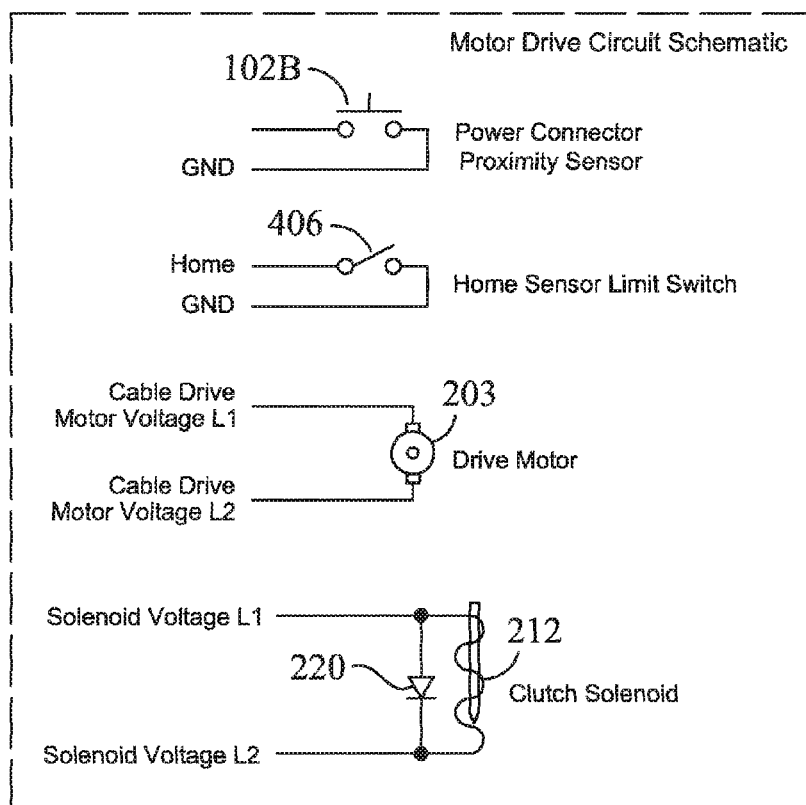
FIG. 32 is a composite schematic diagram of the drive motor, home switch, and clutch solenoid.

The ceiling mounted enclosure 100 (FIGS. 1, 4, 27) has a top cover 104 that has two U channel structures 106 disposed at each side. The top assembly is bolted to two uni-struts 116 that are fastened to the ceiling. The internal side frames 105, (FIGS. 10, 10A, 27 and 28) are hung from the U channel structures 106 and are bolted in place. The support deck 105A is bolted to the side frames 105. The internal structure is covered with a removable bottom cover 103. The bottom cover has three access holes—one for the conduit connections 114, one for the power cable 114A and one for the display status indicators 501 and communication antennas 501B and 502A.

The wall/pole mounting enclosure 200 (FIGS. 2, 3) has a rear cover 203 that is fastened to the pole 202. The internal side frames 205, (FIGS. 11, 12, 29, 30) are hung from the rear cover 203 and are bolted in place. The support deck 205 is bolted to the side frames 205A. The internal structure is covered with a removable front cover 204. The bottom of the front cover 204 has three access holes—one for the conduit connections 114, one for the power cable 114A and one for the display status indicators 501 and communication antennas 501B and 502A.

The cable reel assembly 300 (FIGS. 10, 11A, 12, 12A, 12B) is designed to hold up to twenty five feet of coiled power wire 101 between two disks 301A, 301B and wound on hub 301C. The hub and disk sub assembly is mounted to a ring bearing 301D which is attached to the support deck 205. The hub and disk sub assembly with the power cable are free to rotate in either direction. As the power cable 101 is unwound, by rotating the cable reel assembly 300 counterclockwise, the power cable 101 is guided by the cable spindles 301G extending the cable. When the cable reel assembly 300 is rotated clockwise, the power cable 101 is wound on to the hub 301C retracting the cable. A reel drive sprocket 301F is attached to the bottom disk 301B utilizing multiple drive posts 301E. Rotating the reel drive sprocket 301F rotates the entire cable reel assembly 300. The end of the power cable 101 closes T to the hub 301C is secured by a rotating cable clamp 301H. The rotating cable clamp 301H turns when the power cable 101 is fully extended, which ensures a pre-established break away force is provided.

The motor and clutch assembly 302 (FIGS. 13, 13A, 14, 15, 16) comprises a bidirectional DC drive motor 302A, a drive motor worm gear 302B, a pinned motor drive gear 302B, a motor drive gear 302L with a clutch bearing, an extend idler gear 302D, a retract idler gear 302K, a sprocket drive gear 302E, a drive sprocket 303A, a clutch solenoid 302F, and a clutch plate or arm 302J.

To extend the power cable 101 (FIGS. 14, 15), the cable reel 301 must be rotated counterclockwise 302M. To achieve this, the clutch solenoid 302F (FIG. 14) is not energized, and the compression spring 302H will rotate the clutch plates 302J around the clutch pivot shaft 302I until the extend idler gear 302D engages with the sprocket drive gear 302E. When the drive motor is energized for counterclockwise rotation designated by arrow 302M, the motor drive shaft 302P engages the clutch barring 302O, and drives the motor drive gear with the clutch bearing 302L counterclockwise. This in turn drives the extend idler gear 302D clockwise and the sprocket drive gear 302E counterclockwise designated by arrow 302M. The sprocket drive gear 302E drives the sprocket drive chain 303B and the cable reel assembly 301 counterclockwise designated by arrow 302M unwinding and extending the power cable 101.

To retract the power cable 101 (FIGS. 14, 15), the cable reel 301 must be rotated clockwise designated by arrow 302N. To achieve this, the clutch solenoid 302F (FIG. 14) is energized, and the clutch solenoid plunger 302G will rotate the clutch plates 302J around the clutch pivot shaft 302I until the extend idler gear 302D disengages from the sprocket drive gear 302E and engages the retract idler gear 302K with the sprocket drive gear 302E. When the drive motor is energized, for clockwise rotation designated by arrow 302N, the motor drive gear 302C rotates clockwise. This in turn drives the retract idler gear 302K counterclockwise and the sprocket drive gear 302E clockwise designated by arrow 302N. The sprocket drive gear 302E drives the sprocket drive chain 303B and the cable reel assembly 301 clockwise designated by arrow 302N—winding and retracting the power cable 101.

The cable reel drive assembly 303 (FIGS. 12B, 13, 13A) comprises a drive chain 303B, a reel drive socket 301F, drive chain tension sprockets 303C, drive chain tension arms 303D, and tension spring 303E. The reel drive socket 303A is capable of driving the reel drive chain 303B and the reel drive sprocket 301F either clockwise or counterclockwise. The drive chain tension sprockets 303C, which are held in compression by the tension spring 303E, keep the drive chain 303B fully engaged with the drive sprockets 303A and 301F.

The slip ring assembly 304 (FIGS. 17, 18) comprises a high voltage brush assembly 304A, two low voltage brushes 304B, 304C, and a printed circuit board 304D. A slip ring assembly 304 is required to provide an electrical circuit to power cable 101. Three high voltage/high current brush circuits 304A are needed—two for power and one for the ground circuit. Two low voltage/low current brush circuits 304B and 304C are needed—one for the pilot signal and the other for the proximity signal. The low voltage brushes 304B and 304C (FIG. 17) make contact with two printed circuits circular tracks 304L.

The home position sensor assembly 400 (FIGS. 19, 20) comprises four omni-direction guide rollers 401, three transition guide rollers 401A, a home sensor lift ring 403 with a cable cleaner 402, a home sensor return spring 404, and a home sensor limit switch 406 with a switch lever 405.

As power cable 101 (FIG. 19) is lowered, it is guided by guide rollers 401A through the home sensor lift ring 403, which is held down by the home sensor return spring 404. When the home sensor lift ring 403 is down, the switch lever 405 is down causing a signal to be sent to the central processor unit 500C (FIG. 9), indicating that the power cable home ring 101A is not at the home position 107.

As power cable 101 (FIG. 20) is raised, it is guided by guide rollers 401A through the home sensor lift ring 403, which is held down by the home sensor return spring 404. When the home sensor lift ring 403 is raised by the power cable lift ring 101A, the switch lever 405 is lifted, causing a signal to be sent to the central processor unit 500C (FIG. 9), indicating that the power cable home ring 101A is at the home position 107 and to stop the rewind process.

As the power cable 101 is lowered or raised, it passes through a cable cleaner 402 which removes foreign particles such as ice, water or dirt from the cable jacket. It also prevents insects from entering the enclosure.

Description of Electronic Modules

Figure 26:
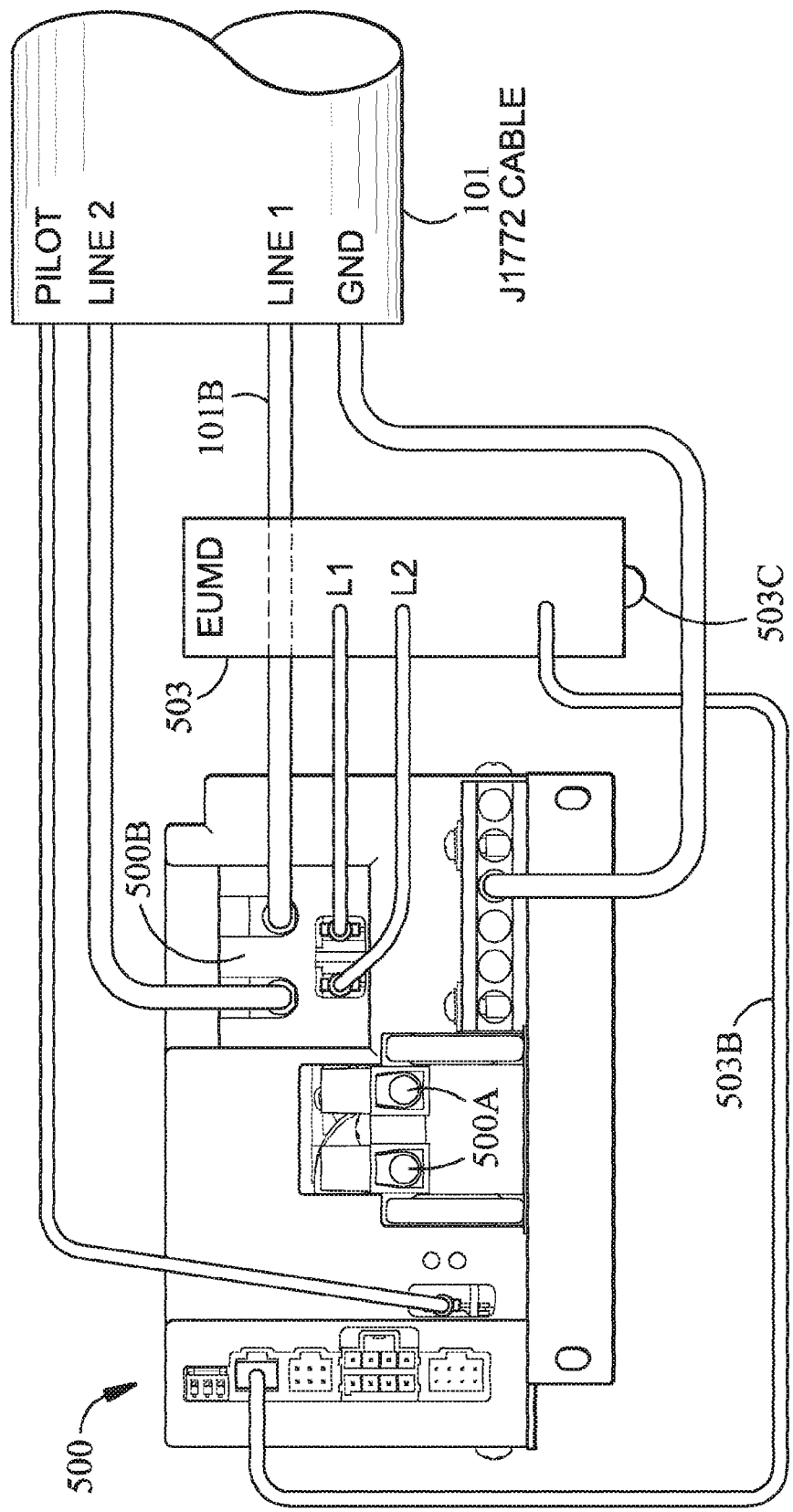
FIG. 26 is wiring diagram of the instillation of a EUMD in an EVSE assembly.

The safety and control module 500 (FIGS. 9, 24, 26) comprises a central processing unit 500C, a current measuring circuit 500D, a ground fault detection circuit 500E, a DC power supply 500I, and a circuit interrupter 500F.

The primary purpose of the safety and control module 500 is to provide the necessary safety circuits for detecting a ground fault (circuit 500E), or an overload current drain (circuit 500D) and to disconnect the power source 500A from the electric vehicle 600 (circuit interrupter 500F) should either occurrence happen.

The central processing unit 500C also communicates with the electric vehicle 600 via the pilot signal 500G to indicate the maximum amount of power that is available at that time.

The central processing unit 500C (FIG. 9) also controls the winding and unwinding of the power cable 101, which is achieved by controlling the motor 302A and the clutch solenoid 302F and monitoring the home sensor limit switch 406.

The central processing unit 500C (FIG. 9) also communicates with the data router 501B and the status display card 501A. The data router 501B provides a communication interface between the central processing unit 500C and remote controlling units such as payment stations 506 (FIG. 39), or gateway modules 507 (FIG. 40). Communications with the data router may take place over directly connected wires or using a wireless R.F. mesh network.

Figure 22:
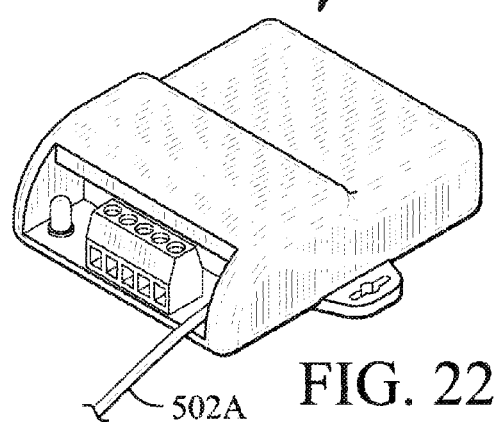
FIG. 22 is an isometric view of the EVSE remote control module.

The central processing unit 500C (FIG. 9) may be activated from a contact closure received from a vehicle detector 505 (FIG. 37), an on/off switch 504A (FIG. 36), an RFID card reader 504B (FIG. 36), or a remote control receiver 502 (FIG. 22). The remote control R.F. signal 502D can be transmitted from a remote control transmitter 502B (FIG. 38) or from the garage door opener 604 (FIG. 6) located inside the electric vehicle 600.

The status display and communication module 501 (FIGS. 9, 21) is an accessory module that can be assembled and configured to fulfill the different communication needs of the overhead EVSE 100, 200 in the cable management functions.

The basic unit of module 501 is equipped with a status display card 501A containing five light emitting diodes that can be easily viewed from below the EVSE 100, 200 (FIGS. 1, 2). The LEDS indicate that primary power is on, that the electric vehicle is connected, that charging is in process, that a problem was detected, and that the EVSE is reserved.

Figure 23:
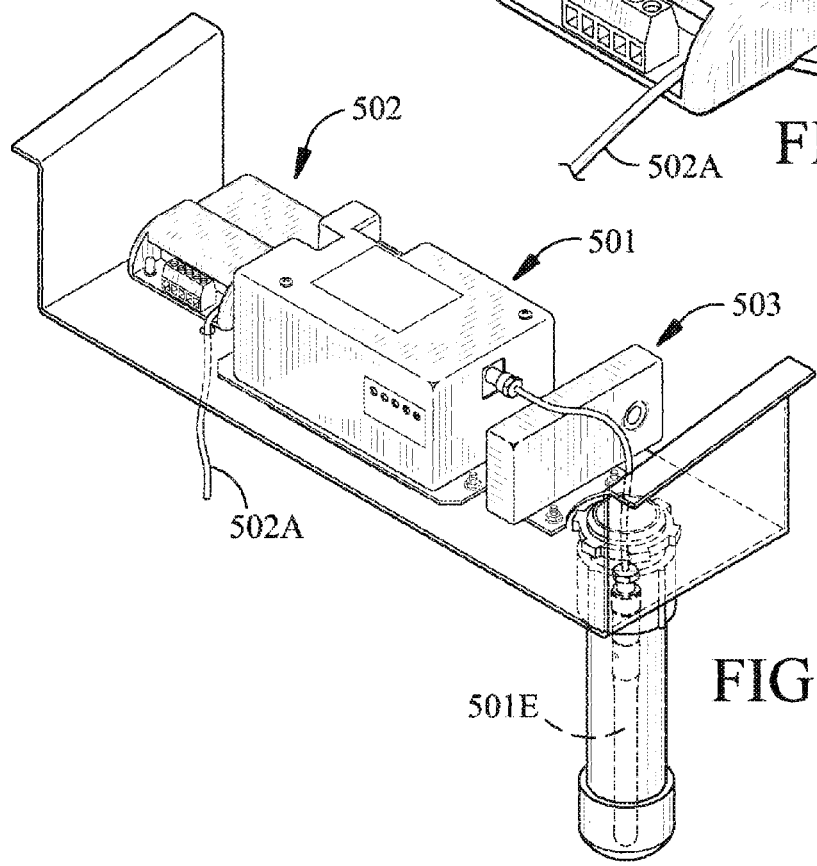
FIG. 23 is an isometric view of the display and control module with an RF antenna, and a remote control module mounted on a bracket.

The module 501, when required, will accept two different data router 501B communication cards. One card will provide two serial RS232 communication ports. The second card will provide an RF transceiver card that will communicate with up to 96 other RF transceivers on the same mesh network. FIG. 23 shows the status display and communication module 501 connected to the RF ZigBee antenna.

One of the RF transceivers could be associated with either a payment station 505 (FIG. 39) or a gateway module 507 (FIG. 40). The remote control receiver 502 (FIGS. 22, 23) is an add on module that is programed to have the same activation code as either the remote control transmitter 302B (FIG. 38) or the garage door opener 604 in the electric vehicle 600 (FIG. 6).

The end user power measuring module 503 (FIG. 25) is an add on module that precisely measures the power being delivered to the electric vehicle 600. To install the unit, one of the AC power wires 101B (FIG. 26) is passed through the EUMD 503 (FIG. 26), two power leads are attached to the power output 500B of the safety and control module 500, and the communication leads are also connected to the module 500.

As AC power is delivered to the electric vehicle 600, the EUMD 503 will precisely measure, store, and output IR optical pulses 503C, indicating the total KW of power measured being delivered to the electric vehicle 600. When the charge cycle is completed, the EUMD 505 will transmit to the central processing unit 500C, the total power delivered to the electric vehicle 600, which in turn will be reported to either the payment station 506, or the gateway module 507, for further processing and billing.

Description of the Remote Control Modules

Figure 36A:
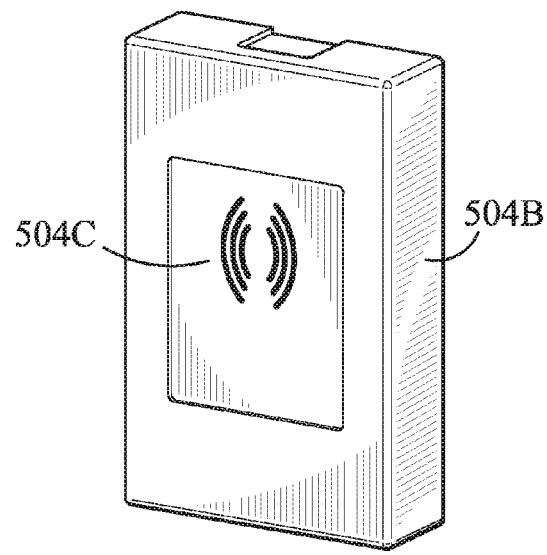
FIG. 36A is an isometric view of an RFID card reader.

The control module 504 (FIG. 36) is a wall mounted module that activates the EVSE 100 with a wired on/off switch 504A. When the switch is 504A pressed, the EVSE 100, 200 is signaled to lower the power cable 101 and its power connector 102 to the ADA height 108. The charging power will be turned off when the power connector 102 is removed from the electric vehicle 600, and the power cable 101 and the power connector 102 will be raised to its home and locked position 107 (FIG. 5). The second version 504B (FIG. 36A) will activate the EVSE 100 with an RFID card reader 504C, which when read correctly will signal the EVSE 100, 200 to lower the power cable 101 and its power connector 102 to the ADA height 108 (FIG. 5). The charging power will be turned off when the power connector 102 is removed from the electric vehicle 600, and the power cable 101 and the power connector 102 will be raised to its home and locked position 107 (FIG. 5).

The vehicle sensor module 505 (FIG. 37) is an ultrasonic or laser distance measuring device that is mounted over the top of where the electric vehicle 600 will park to charge the vehicle. The sensor module 505 will measure the distance from the ceiling 115 to the floor 112 (FIG. 5) when there is no vehicle under it, and store the distance. When an electric vehicle 600 parks in the spot to charge the vehicle (FIG. 6), the vehicle sensor module 505 will now measure a height to the top of the vehicle 605, which is less than the stored distance to the floor, indicating that a vehicle is present and initiating an operational step to lower the power cable 101 and its power connector 102 to the ADA height 108. The charging power will be turned off when the power connector 102 is removed from the electric vehicle 600, and the power cable 101 and the power connector 102 will be raised to its home and locked position 107 (FIG. 5).

The remote control transmitter 502B (FIG. 38) is a battery powered wireless transmitter 502D. Transmitter 502D transmits a coded message to the remote control receiver 502. The remote control transmitter may also be the garage door opener 604, located in the electric vehicle 600 (FIG. 6). When the remote control receiver receives the correct signal, it signals the EVSE 100, 200 to lower the power cable 101 and its power connector 102 to the ADA height 108. The charging power will be turned off when the power connector 102 is removed from the electric vehicle 600, and the power cable 101 and the power connector 102 will be raised to its home and locked position 107 (FIG. 5).

The payment station 506 (FIG. 39) is a support module for one or more EVSEs 100, 200. The payment station 506 communicates with the EVSEs utilizing a wired network 501C (FIG. 35G) or a wireless ZigBee mesh network 501E (FIG. 35H).

The payment station 506 (FIG. 39) is equipped with a display 506C, a key board 506D and a central processor unit 506B.

The payment station 506 (FIGS. 35G, 39) may be configured with one or more payment methods—a magnetic credit/debit card reader 506E, a chip card reader 506F, and a RFID card reader 506G.

The payment station 506 (FIGS. 35G, 39) communicates with the host transaction processor 509 over the wide area network 511 utilizing different means, such as Wi-Fi 506H, Ethernet 506I, or cell phone modem 506J.

The payment may also be made utilizing the user's personal cell phone 508 (FIG. 35G) which communicates directly with the host transaction processor 509.

The gateway module 507 (FIG. 40) is a support module for one or more EVSEs 100, 200. The gateway module 507 communicates with the EVSEs utilizing a wired network 501C (FIG. 35E) or a wireless ZigBee mesh network 501E (FIG. 35F).

The payment station 506 (FIGS. 35G, 39) communicates with the host transaction processor 509 over the wide area network 511 utilizing different means, such as Wi-Fi 506H, Ethernet 506i, or cell phone modem 506J.

The payment may also be made utilizing the user's personal cell phone 508 (FIG. 35E) which communicates directly with the host transaction processor 509.

Detailed Functional Description

Figure 16:
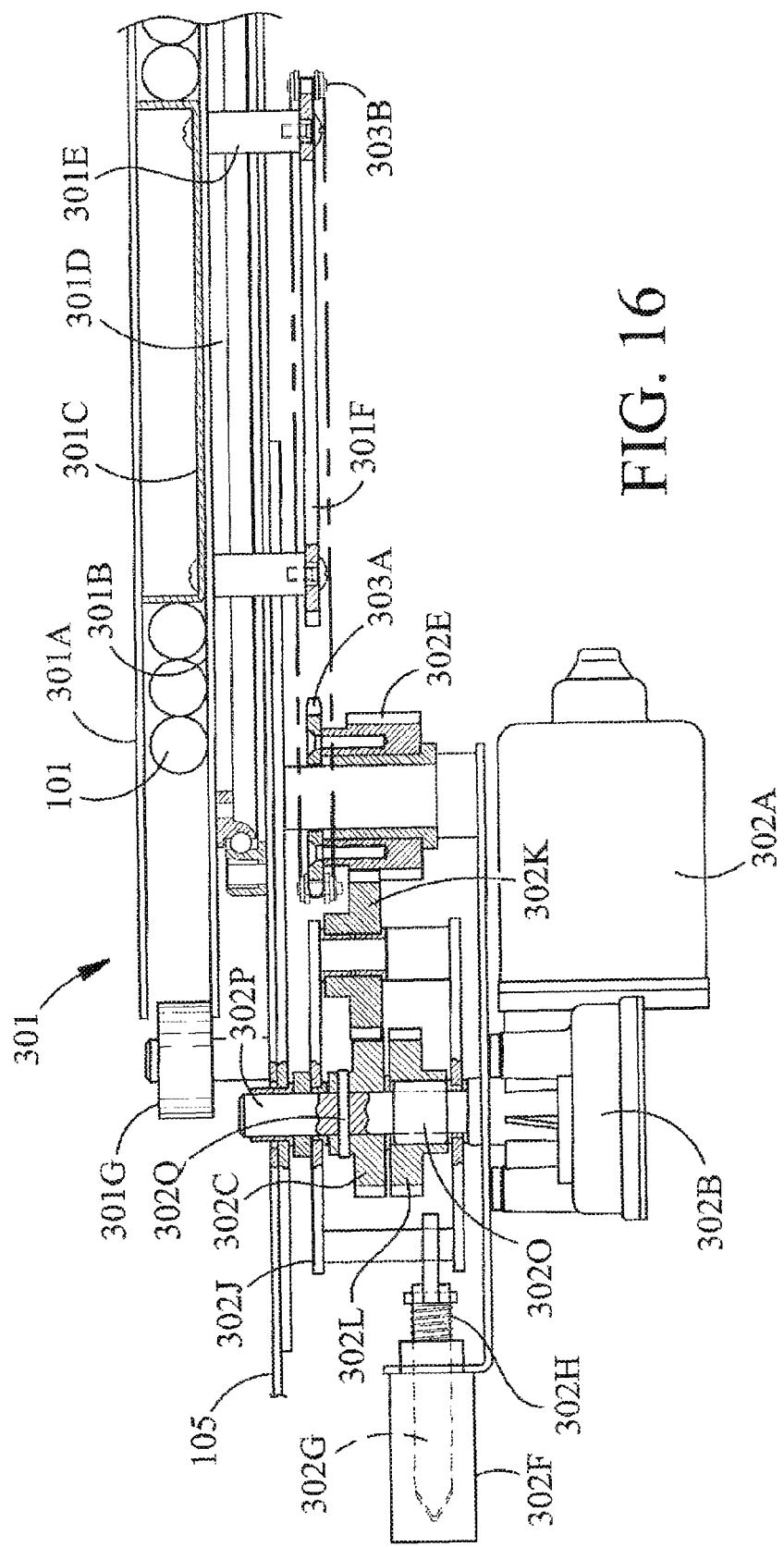
FIG. 16 is a side sectional view of the motorized cable and a drive assembly taken along the lines 16-16 of FIG. 15, with a solenoid clutch plate assembly, having gears engaged in the retract configuration.

To raise the connector 102 (FIG. 5) to the home position 107, the cable 101 must be wound, with a clockwise rotation (CW), onto the cable reel assembly 300 (FIG. 16). To achieve this, the drive motor 302A is energized producing a CW rotation, driving the pinned motor gear 302C. When the clutch solenoid 302F is energized, the retracted idler gear 302K engages between the motor drive gear 302C and the sprocket drive gear 302E. The drive sprocket 303A, which is attached to sprocket drive gear 302E, is driven in a CW rotation (FIG. 15), which in turn drives the drive chain 303B in the CW rotation 302M, again driving the reel drive sprocket 301F in the CW rotation. Drive post 301E attaches the cable reel assembly 301 to the drive sprocket 301F. The cable reel assembly 301 is held in place by ring bearing 301D attached to the internal frame 105. As the drive sprocket 301F rotates CW (FIG. 15), cable 101 is wound on to the cable reel 301.

The cable management system comprises a motor and clutch mechanism 302 that remains locked when in the home position 107 and no power is supplied. The EVSE assembly preferably comprises a mounting frame 105 for the motor and clutch mechanism 302, a cable guide and home sensor 400, a display and communication module 501, an end user measuring module (EUMD) 503 and the remote control RF receiver 502. The ceiling mounted EVSE 100 (FIG. 1) enclosure has a bottom cover 103 with conduit access holes 114 for the electric cable and its connector, the display module status lights 501, communication antenna 501B and remote control RF antenna 502A. The drive assembly 302 (FIG. 13) comprises a motor 302A with a worm drive gear 302B, a motor drive gear 302C, idler drive gears 302D, extend idler drive gear 302D and retract idler drive gear 302K which are attached to a clutch plate 302J that is rotated by a clutch solenoid 302F when energized. The large reel drive sprocket 301F is attached to the cable reel 301 and driven by a drive chain 303B.

The cable management system also comprises a clutch mechanism controlled by a clutch solenoid 302F. The clutch mechanism preferably is comprised of an extend idler gear 302D, a retract idler gear 302K, a motor drive gear 302C, a motor drive gear 302L with a clutch bearing, a drive sprocket gear 302E, a clutch lever 302I, a clutch solenoid 302F with a spring 302F attached to the plunger 302G of the clutch solenoid. Upon de-energizing the clutch solenoid 302F, the extend idler gear 302D engages the drive sprocket gear 302E, with the motor drive gear 302L with clutch bearing and when the drive motor 302A is energized with a counterclockwise rotation, the electric cable 101 and the connector 102 are lowered to the ADA height (4') above the garage floor. At any time, when the cable and connector are being lowered, or reaches the ADA height, the motor drive gear 302L, with the clutch bearing, allows the cable and connector to be manually extended to its fullest length.

Upon sensing the connection of the electrical connector 102 to an electric vehicle, the clutch solenoid 302F is energized. Upon energizing the clutch solenoid, the lever 302J pivots and the extend idler gear 302D separates from the small sprocket drive gear 302E. At the same time, the retract idler gear 302K engages with the small sprocket drive gear 302E. The drive motor worm drive gear 302B prevents the cable reel 301 from rotating. The reel is thereby locked to prevent further extension of the electrical cable. Upon disconnecting the vehicle connector from the electric vehicle, drive motor 302A is energized to rotate in a clockwise rotation (arrows 302N), which in turn drives the cable reel 301 in a clockwise rotation, winding up the electrical cable until the connector 102 reaches the home position. When the connector reaches the home position, the power to the drive motor 302A is removed, again locking the cable and connector in position.

The EVSE installation preferably comprises a sensor 400 that senses the home position of the cable and the connector. The sensor 400 may be either a magnetic sensor or a mechanical switch.

Figure 17:
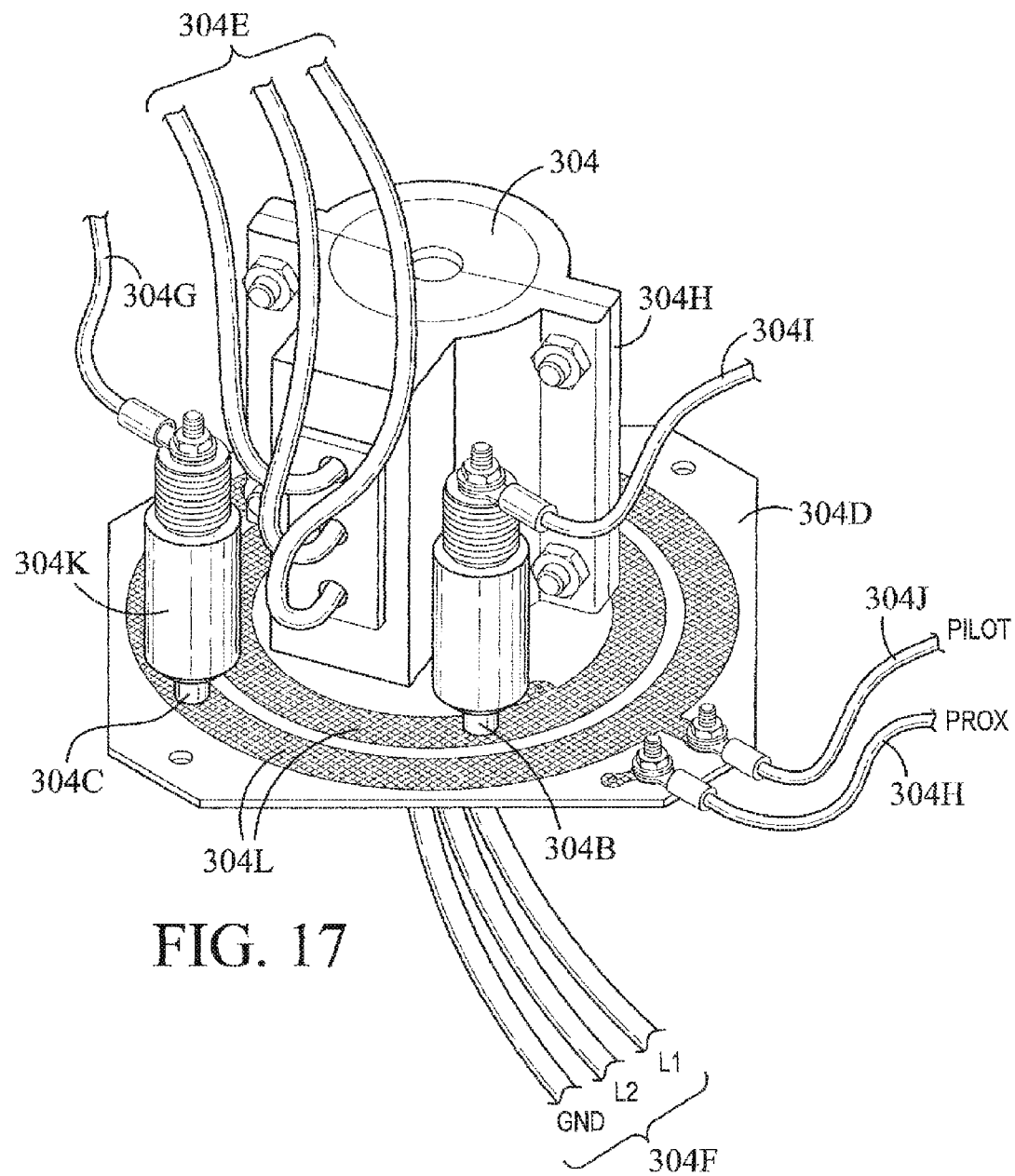
FIG. 17 is an isometric view of a slip ring assembly with low voltage pilot and proximity rings.

The overhead electric vehicle service equipment EVSEs 100, 200 incorporate the use of a five channel slip ring assembly 304. Three high voltage, high current brushes are housed in the high voltage brush assembly 304A. Two low voltage, low current brushes holders 304K are provided— one to hold the pilot signal brush 304B and one to hold the proximity signal 304C (FIGS. 17, 18). The low voltage brushes 304B, 304C, ride on two conductive circular paths on a printed circuit board 304D.

While preferred embodiments have been set forth for purposes of illustration, the foregoing descriptions should not be deemed a limitation of the invention herein. Accordingly, various modifications, adaptations and alternatives may occur to one skilled in the art without departing from the spirit and the scope of the present invention.

The invention claimed is:

1. An EVSE installation comprising:
   a housing having a bottom cover defining an opening;
   a reel disposed in said housing above said bottom cover and having a central hub rotatable about an axis;
   an electrical cable with a vehicle connector at one end and connectable to a power supply at the other end and being retractable and extendable through said opening onto and from said reel;
   a cable management system comprising a drive assembly for said reel and having a drive mode to retract said cable and a release mode to drivably extend said cable and said cable being manually extendable when said drive assembly is in said release mode;
   wherein said drive assembly drives said cable onto said reel so that said cable progressively winds on the hub to form a coiled configuration and said cable and connector are disposed at a stable home position with said connector disposed below said opening.

2. The EVSE installation of claim 1 wherein said housing is supported on a ceiling, pole or a wall.

3. The EVSE installation of claim 1 wherein the motorized cable management system comprises a clutch mechanism that remains locked when no power is applied.

4. The EVSE installation of claim 1 wherein said housing comprises a front cover that has an opening for a display panel and antennas and receives the vehicle connector at the home position, and a rear cover that is mounted to either a pole or a wall.

5. The EVSE installation of claim 1 wherein the housing has a bottom cover that has an opening for a display panel and antennas and receives the vehicle connector at the home position, and a top cover that is mounted to a ceiling.

6. The EVSE installation of claim 1 wherein the drive assembly comprises a motor and a drive gear rotatably connecting with a drive member.

7. The EVSE installation of claim 6 wherein the cable management system comprises a clutch mechanism controlled by a clutch solenoid.

8. The EVSE installation of claim 7 wherein said cable management system comprises a clutch gear, a clutch arm and a spring attached to the clutch arm and upon de-energizing of the clutch solenoid, the clutch gear engages the drive gear.

9. The EVSE installation of claim 6 wherein after sensing connection of the vehicle connector to an electric vehicle, the solenoid and the motor are not energized, and the drive member is thereby locked to prevent further extension of said cable.

10. The EVSE installation of claim 6 wherein upon energizing said solenoid, the arm pivots and the clutch gear separates from the drive gear so that the drive gear is free to rotate and the cable is freely extendable.

11. The EVSE installation of claim 1 wherein upon disconnecting the vehicle connector from the electric vehicle, the cable is automatically retracted into said reel by said drive assembly.

12. The EVSE installation of claim 1 further comprising a sensor that senses the home position of said cable and said connector.

13. The EVSE installation of claim 12 wherein said sensor comprises a mechanical limit switch or a magnetic sensor.

14. The EVSE installation of claim 1 further comprising a centering guide ring through which said cable passes.

15. A cable management system for charging electric vehicles comprising:
    a cable connectable to a power supply and having an EV connector;
    a rotatable reel which receives said cable and releases and retracts said cable;
    a drive assembly for said reel comprising an electrically operated motor which connects via a clutch with a bi-positionable gear assembly engageable with a continuous transfer member operatively engageable with said reel to bi-directionally rotatably drive said reel; and
    a controller which automatically controls said drive assembly wherein said cable is lowerable to an access position, is manually extendable from said reel while being lowered to said access position and is manually extendable at said access position for connection to an EV and retractable to store the connector in a locked position.

16. The cable management system of claim 15 wherein said continuous transfer member comprises a sprocket chain.

17. The cable management system of claim 16 further comprising a drive sprocket and a driven sprocket each engageable with said sprocket chain and said driven sprocket being rotatably fixed with said reel.

18. A cable management system for charging electric vehicles comprising:
    a cable connectable to a power supply and having an EV connector;
    a rotatable reel which receives said cable and releases and retracts said cable;
    a drive assembly for said reel comprising an electrically operated motor which connects via a clutch with a bi-positionable gear assembly engageable with a continuous transfer member operatively engageable with said reel to bi-directionally rotatably drive said reel, wherein said gear assembly comprises a first drive gear pinned to a motor shaft, a clutch drive gear with a clutch bearing, a retractor idler gear, and a deployment idler gear wherein each of said idler gears are sequentially engageable with a drive sprocket gear; and a controller which automatically controls said drive assembly wherein said cable is lowerable to an access position, manually extendable for connection to an EV and retractable to store the connector in a locked position.

19. The cable management system of claim 15 wherein said gear assembly is mounted to an arm and the position of said arm is determined by a solenoid.

20. The cable management system of claim 19 wherein said solenoid is spring biased to force the arm to position the deployment idler gear to engage with the drive sprocket gear.

21. The cable management system of claim 19 wherein said solenoid is actuatable to position said arm wherein said deployment idler gear disengages from said drive sprocket gear, and said retractor idler gear engages said drive sprocket gear to retract said cable.

22. The cable management system of claim 17 further comprising at least one tension arm which exerts a tension against said drive sprocket.

23. The cable management system of claim 15 further comprising a home position sensor assembly which senses the home position of said connector.

24. The cable management system of claim 15 further comprising a ground fault control module which senses a ground fault and causes the termination of power to said cable.

25. The cable management system of claim 15 further comprising a communication module to receive and transmit a remote signal.

26. The cable management system of claim 15 further comprising an end user power measuring module which precisely regulates the power supplied by said cable.

27. The cable management system of claim 15 further comprising an input unit for said controller comprising a device selected from the group consisting of a card reader, a keyboard, a cell phone, a computer and a pay station.

28. The cable management system of claim 15 further comprising an EV sensor.

29. The cable management system of claim 15 further comprising a cable connected switch having a connected and a disconnected state and a cable connected timer for delaying retracting said cable for a pre-established time after occurrence of the disconnected state.

* * * * *